United States Patent [19]
Nishitani et al.

[11] Patent Number: 5,640,271
[45] Date of Patent: Jun. 17, 1997

[54] SELF-HOUSING BINOCULAR

[75] Inventors: Kiyoshi Nishitani, Sakai; Yasumasa Sugihara, Hashimoto; Hiroyuki Okada, Sakai, all of Japan

[73] Assignee: Minolta Co., Ltd., Osaka, Japan

[21] Appl. No.: 503,188

[22] Filed: Jul. 17, 1995

[30] Foreign Application Priority Data

| Jul. 21, 1994 | [JP] | Japan | 6-169186 |
| Jul. 22, 1994 | [JP] | Japan | 6-170832 |
| Aug. 2, 1994 | [JP] | Japan | 6-181061 |
| Aug. 4, 1994 | [JP] | Japan | 6-183196 |

[51] Int. Cl.$^6$ ............................. G02B 23/00
[52] U.S. Cl. .................. 359/412; 359/407; 359/410
[58] Field of Search .................. 359/407, 410, 359/411, 412, 415, 425, 426

[56] References Cited

U.S. PATENT DOCUMENTS

| 4,268,151 | 5/1981 | Kobori et al. | 354/219 |
| 4,284,325 | 8/1981 | Ishibai et al. | 350/36 |
| 5,078,503 | 1/1992 | Ueda | 359/823 |
| 5,212,591 | 5/1993 | Funathu | 359/410 |
| 5,212,592 | 5/1993 | Kato | 359/410 |
| 5,235,458 | 8/1993 | Akagi et al. | 359/410 |
| 5,305,141 | 4/1994 | Hotta | 359/415 |
| 5,444,568 | 8/1995 | Williams, Jr. et al. | 359/410 |

FOREIGN PATENT DOCUMENTS

| 0433907 | 6/1991 | European Pat. Off. | 359/412 |
| S52-148944 | 11/1977 | Japan . |
| S55-4471 | 1/1980 | Japan . |
| S55-18206 | 2/1980 | Japan . |
| 405107441 | 4/1993 | Japan | 359/412 |

*Primary Examiner*—Timothy P. Callahan
*Assistant Examiner*—My-Trang Nu Ton
*Attorney, Agent, or Firm*—Sidley & Austin

[57] ABSTRACT

A binocular has the right and left optical systems. A distance between these optical systems is variable for an adjustment of the pupil distance. A protecting member is arranged to protect objective lenses and eyepieces of the optical systems by sheltering them when the binocular is housed. The protecting member is movable to release the sheltering condition to expose the lenses and the eyepieces when the binocular is used. The protecting member is driven in liaison with an operation of the adjustment of the pupil distance.

13 Claims, 25 Drawing Sheets

SELF-HOUSING BINOCULAR

BACKGROUND OF THE INVENTION

1. Field of the Invention

The present invention relates to a binocular, and more particularly, to a binocular of horizontally moved type.

2. Description of the Prior Art

Typically, the eyepieces and the objective lenses of a binocular provided at the front and rear ends of the left and right lens barrels are exposed to the outside. For this reason, if the binocular is left uncovered when not used, dirt such as dust and oil is apt to adhere to the lens surfaces, and the lenses may be scratched when the dirt is wiped off. To solve such a problem, typically, four lens caps (a pair for each of the front and rear ends) for covering the lens surfaces are prepared for a binocular in correspondence with the eyepieces and the objective lenses. When the binocular is not used, these caps are attached at the front and rear ends of the lens barrels to protect the eyepieces and the objective lenses.

However, as many as four lens caps are necessary for one binocular as described above and the lens caps which are maintained attached only by a pressure contact with the peripheries of the lens barrels when they are attached to the lens barrels are readily disconnected only by slight vibration or external force. For this reason, even if not all of them are lost, some of them may be lost without being noticed.

In addition to the problem that the lens caps are readily lost, these lens caps are inconvenient such that the pupil distance cannot be adjusted unless the caps are detached every time the binocular is used and that it is necessary to keep the detached caps in some way.

A typical conventional binocular is such that one lens barrel is attached to a central shaft provided to protrude from a side of the other lens barrel to be rotatable within a predetermined angle range, that a focusing operation member is provided coaxially with the central shaft to be rotatable by a predetermined number of rotations, that the pupil distance is adjusted by folding the lens barrels in two at the central shaft, and that focusing is performed by rotating the focusing operation member with the lens barrels being held by the hands.

In the case of a conventional binocular of such a folded type, since it basically takes a symmetrical form, the distances between the focusing operation member arranged in the center and the left and right lens barrels are the same, so that focusing, which is performed by rotating the focusing operation member after the pupil distance is adjusted, can be performed without hindrance with any of the right and left hands. Thus, there is no difference in operability according to whether the user is right-handed or left-handed.

However, in the binocular of folded type, it is necessary to satisfy the following two contradicting conditions: that the left and right lens barrels are not shifted from the adjusted positions after the pupil distance has been adjusted; and that the operation to fold the left and right lens barrels is smoothly performed. For this reason, the adjustment of a force to fasten one lens barrel to the central shaft is difficult and it is structurally difficult to provide an automatic focusing function.

As prior arts to solve this problem, for example Japanese Published Utility Model Application No. S57-34486 and Japanese Laid-open Patent Application No. S55-161205 disclose so-called binoculars of horizontally moved type where, to adjust the pupil distance, a focusing operation member is arranged in one lens barrel and the other lens barrel is linearly movable perpendicularly to the optical axis toward the one lens barrel.

The horizontally moved type binocular is advantageous over the folded type in that no screws are necessary for connecting the left and right lens barrels requiring fastening and adjustment and that the automatic focusing function can be provided. However, since one of the lens barrels is slid to adjust the pupil distance, according to the position to which the focusing operation member is attached, generally, it is inconvenient for a left-handed person to use the binocular.

Specifically, in Japanese Laid-open Patent Application No. S55-161205, a rotary knob serving as the focusing operation member is provided to protrude only from one surface and to lean toward one of the lens barrels. Japanese Published Utility Model Application No. S57-34486 does not specifically show any focusing operation member.

Referring to FIG. 1, there is schematically shown an example of a binocular where the focusing operation member is provided at the same position as that of Japanese Laid-open Patent Application No. S55-161205. As is apparent from this figure, in an arrangement where a focusing operation member 11 is arranged to protrude only from the center of the upper surface in a housed condition where the distance between the left and right lens barrels 1 and 2 is minimum, when a left-handed person uses the binocular under a condition where the pupil distance has been adjusted by sliding the left lens barrel 2 which is movable, the vicinity of the portion between the bases of the thumb and the forefinger interferes with the left lens barrel 2 when the fingers are reached to the focusing operation member 11 to perform focusing. This is very uncomfortable.

In an arrangement where the focusing operation member 11 is thus arranged only on one surface, since the upside and the downside of the binocular is fixed, when the binocular is operated with the right hand, the operation member 1 is located close to the bases of the fingers. However, when the binocular is operated with the left hand, not only the focusing operation member is farther from the fingers but a distance A to the focusing operation member 11 varies according to the pupil distance. Thus, the operability differs according to whether the user is right-handed or left-handed. In particular, the operability may greatly be inferior for left-handed persons.

All this adds up to the following: In a conventional binocular asymmetric in the left and right direction, for example in a binocular where the focusing operation member is provided on the left or right side, the operability remarkably differs according to whether the user is right-handed or left-handed. Such an inconvenience is a great problem under the present circumstances where the size of the binocular is increasingly reduced so that the user can hold it only with one hand.

As a solution to the problem of the difference in operability according to whether the user is right-handed or left-handed, it is considered to prepare two kinds of binoculars: one is for right-handed persons and the other, for left-handed persons. However, not only this increases the manufacture cost but when one kind of the binocular is used by a plurality of persons, the above-described problem will result. Thus, this cannot be a radical solution to the problem.

Typically, in a binocular, the dioptric power is adjusted to meet the user's eyesight by moving a part of the optical systems, e.g. eyepieces and objective lenses of the left and right lens barrels. Conventionally, a mechanism for such dioptric power adjustment is provided with a dioptric power adjusting ring interlocked, for example, with the eyepieces of the lens barrels. To adjust the dioptric power, under a condition where the binocular is focused on infinity, the dioptric power adjusting ring is rotated in a plus or a minus direction by a manual operation so that a part of the optical systems is moved along the optical axis together with the movement of the ring.

As another prior art, a binocular provided with an automatic focusing function is known where by driving the optical systems by use of a driving force of a motor, the dioptric power is automatically adjusted only by operating a switch. As a binocular provided with a dioptric power adjusting mechanism of such an automatic controlling method, for example, Japanese Laid-open Patent Application No. H5-11195 discloses a binocular where a means for adjusting the dioptric power is electrically controlled to thereby disable the dioptric power adjustment when the main switch is OFF.

In the former binocular of the manual adjustment type, since the dioptric power adjusting ring is provided at an eyepiece window which is easily reached so that the user can always adjust the dioptric power, when the binocular is not used, the dioptric power may be changed without the user knowing it by unconsciously touching the dioptric power adjusting ring or by another object touching the dioptric power adjusting ring.

The change of dioptric power which can thus occur accidentally is not limited to the binocular provided with the dioptric power adjusting ring. This can occur in a conventional binocular using the manual adjustment method since for reasons of operability, the dioptric power adjustment is arranged to expose outside in such a binocular.

In a binocular like the latter binocular disclosed by Japanese Laid-open Patent Application No. H5-11195 where the dioptric power adjusting mechanism is disabled while the main switch is OFF, the problem that the dioptric power adjusting mechanism is accidentally operated when the binocular is not used is considered to be prevented. In actuality, since an operation member for turning on and off the main switch and a user select switch operation member for the user to arbitrarily change the dioptric adjustment data are provided to be exposed at a portion on the external surface of the binocular where the operation members are easily operated, the operation members are accidentally moved without the user knowing it, which results in the change of dioptric power.

As typical binoculars of pupil distance adjusting type, the following are known: a folded-type binocular where one lens barrel is attached to a central shaft protruding from a side of the other lens barrel to be rotatable within a predetermined angle range and the pupil distance is adjusted by folding the lens barrels in two about the central shaft; and a horizontally-moved type binocular where to adjust the pupil distance, one lens barrel is linearly moved in a horizontal direction perpendicular to the optical axis relative to the other lens barrel. In these typical binoculars, the pupil distance is adjusted by manually moving one lens barrel so that the distance with the other lens barrel increases or decreases.

In the above-mentioned typical binoculars, generally, the pupil distance is reduced to the minimum so that the binocular is compact in the housed condition where the binocular is not used and the pupil distance is adjusted when the binocular is used. In recent years, in many cases, a binocular used for a special purpose such as bird watching as well as a comparatively small size binocular suitable for seeing a play and watching a sport is used exclusively by the owner. In such a case, however, although the binocular is used only by a specific person and the pupil distance is naturally invariable, it is necessary to adjust the pupil distance every time the binocular is taken out of its housing case and used. This is disadvantageous and inconvenient.

As prior arts intended to solve such disadvantage and inconvenience, for example, first, Japanese Laid-open Utility Model Application S48-29838 discloses a pupil distance restricting unit which declines the eyepiece barrels so that a pre-restricted pupil distance is obtained, and secondly, Japanese Laid-open Utility Model Application S50-120450 discloses a pupil distance restricting unit which adjusts the position of declination of a pupil distance restricting ring to decline the lens barrels so that a predetermined pupil distance is obtained.

The pupil distance restricting units of the first and second prior arts are both designed to restrict the distance between the left and right lens barrels within a predetermined distance by stoppers previously set at predetermined positions in adjusting the pupil distance to use the binocular. Therefore, once the positions of the stoppers is set, an optimum pupil distance adjusted condition is always obtained only by increasing the distance between the left and right lens barrels until they are stopped by the stoppers without viewing through the lens barrels.

In the cases of the first and second prior arts, once the pupil distance is set to a predetermined distance, the presence of the stopper saves the trouble of re-adjusting the pupil distance. However, since no driving means is provided for varying the pupil distance from the housed condition to the used condition, it is necessary to perform the operation to increase the distance between the lens barrels until they are stopped by the stoppers while holding the left and right lens barrels by hands. Thus, both hands are occupied with this operation.

To solve such a problem, it is considered to enable an arbitrary and automatic pupil distance adjustment between the housed condition and a position restricted by the stopper through a motor driving as shown in FIG. 2 by using a pupil distance driving mechanism as disclosed by Japanese Laid-open Patent Application No. H5-107441, i.e. by using a mechanism provided with a motor to drive a pupil distance varying mechanism incorporated in the binocular so as to adjust the pupil distance to meet the user's pupil distance and by combining the pupil distance driving mechanism with the pupil restricting unit of the second prior art.

However, in this case, the binocular can merely be designed so that the pupil distance is arbitrarily adjustable between the housed condition where the pupil distance is minimum and the used condition where the pupil distance is set to an optimum distance by operating an operation member provided for pupil distance adjustment, and it is impossible to adjust the pupil distance from the housed condition to a set pupil distance by a momentary operation. For this reason, it is necessary for the user to depress the operation member all the time until the pupil distance is set to the set value.

SUMMARY OF THE INVENTION

An object of the present invention is to provide a binocular whose eyepieces and objective lenses are prevented from being flawed when the binocular is not used, and can be released by a simple operation without any need to detach the protecting means when the binocular is used.

Another object of the present invention is to realize a binocular where there is no difference in operability according to whether the user is right-handed or left-handed.

Yet another object of the present invention is to provide a binocular designed to surely disable the dioptric power adjustment in a housed condition and to enable the dioptric power adjustment to be freely performed in a used condition.

Still another object of the present invention is to provide a binocular where the pupil distance can be changed from a housed condition to an arbitrarily set used condition by a single operation with one hand.

To achieve the above-mentioned objects, a binocular of the present invention is provided with a pair of optical systems where a relative distance between the pair of optical systems is variable, a protecting member arranged to be movable between a sheltering position where the protecting member covers a surface of each of the optical systems which is exposed outside and an open position where the protecting member does not cover the surface of each of the optical systems, and a moving mechanism which moves the protecting member between the sheltering position and the open position in liaison with a variation in relative distance between the optical systems.

According to such features, when the binocular is not used, by bringing the lens barrels into a housed condition, i.e. by decreasing the distance between the left and right optical systems to the minimum, the left and right protecting members relatively move from positions where they are relatively retreated from the left and right optical systems to positions to protect to the left and right optical systems. Thereby, the exposed lens surfaces of the left and right optical systems are covered with corresponding protecting members, so that there is no flawing factors such as the adhesion of external dirt. Thus, the lenses are surely prevented from being flawed.

When the binocular is used, by moving the left and right optical systems outward to change the condition of the lens barrels from the housed condition to the used condition, the left and right protecting members are relatively moved from the positions to protect the left and right optical systems to the retreated positions. Thereby, the lens surfaces of the left and right optical systems are exposed to enable the use of the binocular.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
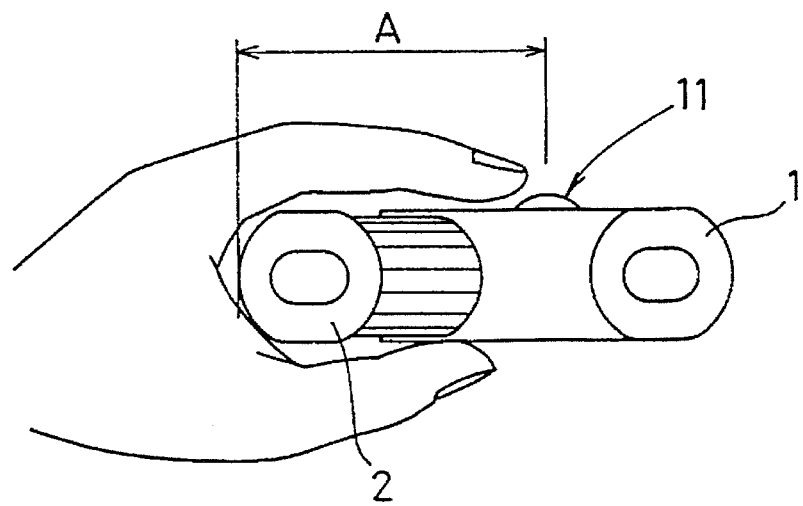
FIG. 1 is a front view showing an inconvenient condition of a conventional binocular.
Figure 2:
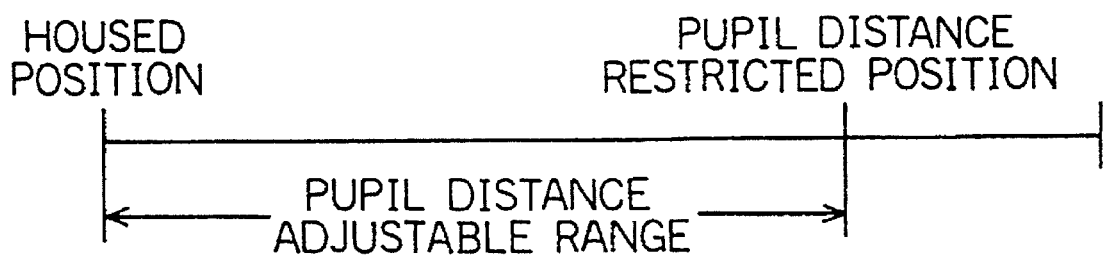
FIG. 2 is a diagram showing a mode and a pupil distance adjustment range of a combination of prior arts.
Figure 3:
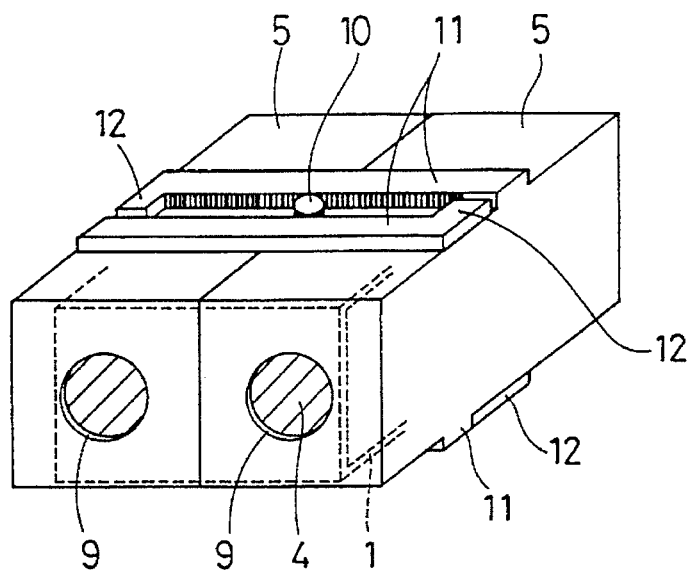
FIG. 3 is a perspective view showing a housed condition of a binocular of a first embodiment of the present invention.
Figure 4:
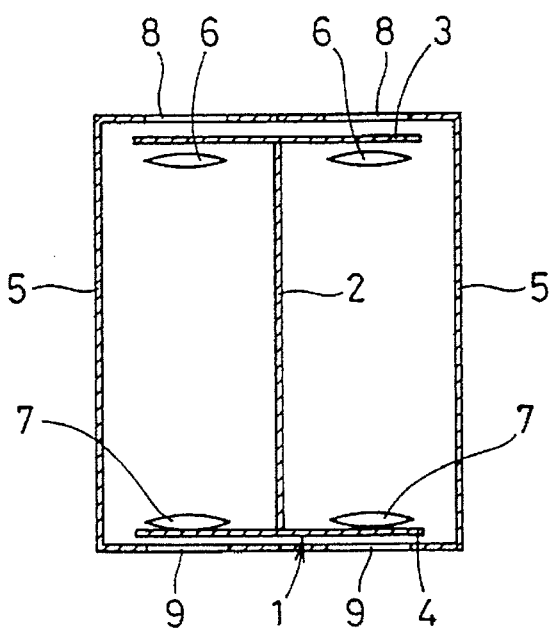
FIG. 4 is a schematic lateral cross-sectional view of the binocular of FIG. 3.
Figure 5:
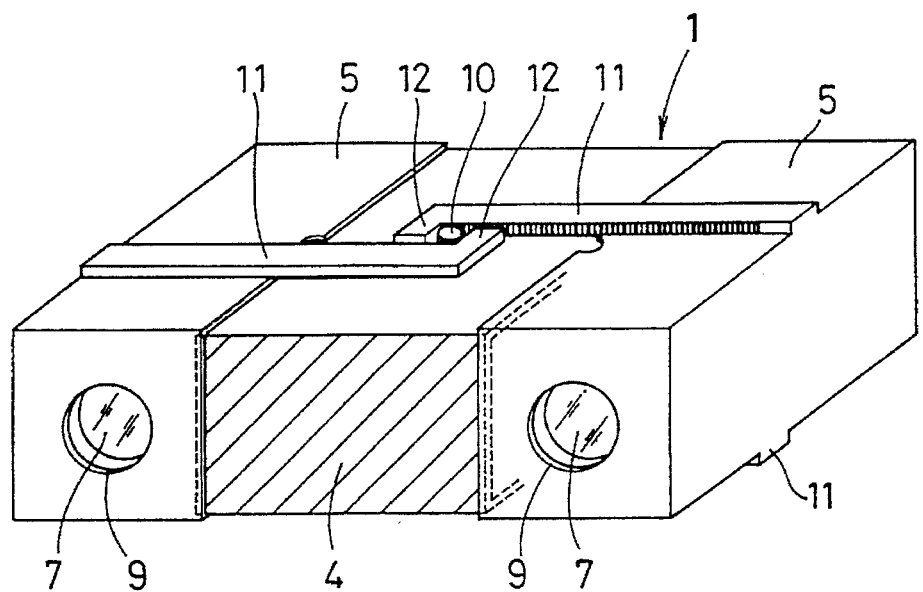
FIG. 5 is a perspective view showing a used condition.
Figure 6:
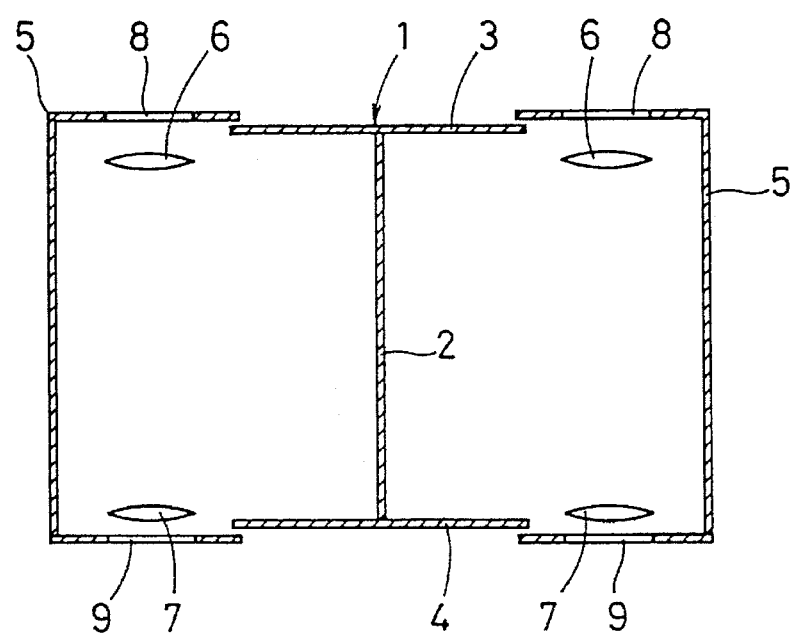
FIG. 6 is a schematic lateral cross-sectional view of FIG. 5.

Hereinafter, embodiments of the present invention will be described with reference to the drawings. FIGS. 3 to 6 show the first embodiment of a binocular of the present invention. FIGS. 3 and 4 show the housed condition. FIGS. 5 and 6 show the used condition. In these figures, reference numeral 1 represents the body of the binocular which takes a form of a box open at the left and right ends. A partition 2 extending backward and forward is provided in the center of the box-form frame. The front and rear vertical walls of the box-form frame function as barriers 3 and 4 serving as protecting members.

With respect to the optical systems of the binocular, lens barrels 5 are arranged on the left and right to be symmetrical about the central axis along the partition 2 of the body 1 and left and right optical systems are incorporated in the lens barrels 5. Specifically, in each of the left and right lens barrels 5, along the incident light path, an objective lens 6 and an eyepiece 7 are arranged at the front and at the rear, respectively. The objective lenses 6 are designed to be simultaneously movable backward and forward in the lens barrels 5 for focusing along the optical axis. The eyepieces 7 are designed to be independently movable in the lens barrels 5 for dioptric power adjustment.

Specific mechanisms for focusing and dioptric power adjustment are not shown in the drawings to avoid complexity since they are irrelevant to these embodiments. It is noted that some types of binoculars are provided with no dioptric power adjusting mechanism to move the eyepieces 7.

The left and right lens barrels 5 are each open at one side surfaces which face the body 1, respectively, and the inner peripheries of the openings engage with the outer peripheries of the left and right openings of the body 1 so as not to be disengaged therefrom, so that they are slidable in a direction to increase and decrease the distance therebetween for pupil distance adjustment.

Under this attachment condition, the partition 2 of the body 1 functions as a side wall of one of the left and right lens barrels 5, whereby the light intercepting capability of the lens barrels 5 is maintained irrespective of the movement of the lens barrels 5. Reference numeral 8 represents a light admitting window. Reference numeral 9 represents an eye window. These are provided at the front and rear ends of the left and right lens barrels 5 which face the objective lenses 6 and the eyepieces 7, respectively.

In such an arrangement, in this embodiment, the objective lens protecting barrier 3 provided at the front of the body 1 is arranged between the light admitting windows 8 and the objective lenses 6 and the eyepiece protecting barrier 4 provided at the rear is arranged between the eye windows 9 and the eyepieces 7. In the center of the upper and bottom surfaces of the body 1, a pinion type rotary gear 10 is attached which rotates about a vertical axis.

On the upper and bottom surfaces of the left and right lens barrels 5, rack type linear gears 11 are provided to be orthogonal to the axes of the lens barrels 5. The linear gears 11 always engage with the rotary gears 10 and as shown in FIGS. 3 and 5, when the lens barrels 5 are moved for pupil distance adjustment along the body 1, by the engagement between the rotary gears 10 and the linear gears 11, the lens barrels 5 move leftward and rightward by the same amount so that the distance therebetween increases or decreases. At the outer end of each of the linear gears 11, a stopper 12 caused to interfere with the rotary gear 10 is integrally provided. When the distance between the left and right lens barrels 5 is increased to the maximum, the stoppers 12 interfere with the rotary gear 10 to restrict the detachment of the barrels 5 from the body 1.

In this case, since the optical systems in the lens barrels 5 move in accordance with the leftward and rightward movement of the lens barrels 5, in the housed condition as shown in FIG. 4 where the distance between the left and right optical systems is minimum, the exposed surfaces of the objective lenses 6 and the eyepieces 7 overlap the positions of the barriers 3 and 4 fixed to the body 1, so that the objective lenses 6 and the eyepieces 7 are sheltered and protected from the outside. In the used condition as shown in FIG. 6 where the left and right lens barrels 5 are moved outward, i.e. in a direction such that the distance therebetween increases for pupil distance adjustment, the barriers 3 and 4 relatively retreat from the objective lenses 6 and the eyepieces 7, so that the binocular is usable.

Thus, in this embodiment, the barriers 3 and 4 are provided to face the objective lenses 6 and the eyepieces 7 instead of the conventional lens caps, so that in the pupil distance adjustment, only by performing a normal operation to change the condition of the lens barrels 5 from the housed condition to the used condition or vice versa, the barriers 3 and 4 retreat from the objective lenses 6 and the eyepieces 7 or shelter the lenses 6 and 7 from the outside.

Figure 7:
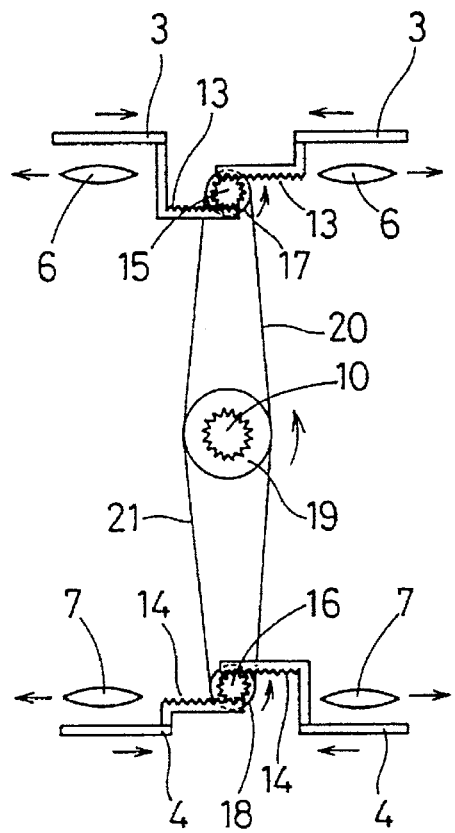
FIG. 7 is a schematic plan view showing a barrier driving mechanism in the housed condition of a binocular of a second embodiment of the present invention.
Figure 8:
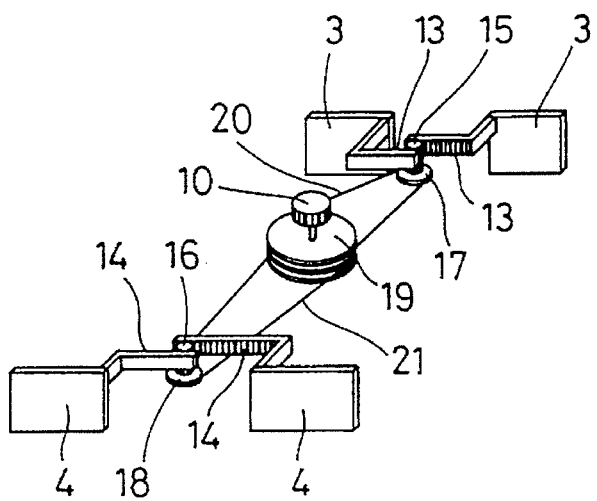
FIG. 8 is a schematic perspective view of the barrier driving mechanism of FIG. 7.

FIGS. 7 and 8 show the second embodiment of a binocular of the present invention. FIG. 7 shows a mode of the barriers 3 and 4 in the housed condition. FIG. 8 shows a barrier driving mechanism. In this embodiment, portions and elements having the same structures and workings as those of the first embodiment are identified by the same reference designations. In this embodiment, the objective lens protecting barrier 3 and the eyepiece protecting barrier 4 are designed to move in a direction opposite to the directions in which the left and right optical systems move to increase or decrease the distance therebetween. Thereby, if the size of the binocular is the same, the distance between the lens protecting position and the retreated position is small compared to the first embodiment.

Specifically, in this embodiment, the front and rear barriers 3 and 4 are formed to be separate from the body 1 and to independently correspond to the objective lenses 6 and the eyepieces 7 of the left and right lens barrels 5, so that a total of four lens barriers 3 and 4 arranged on the front and rear, on the left and right are caused to interlock with the movement of the left and right lens barrels 5 by the barrier driving mechanism structured as described below.

The front and rear barriers 3 and 4 have linear gears 13 and 14 extending from the inner side ends of the body 1, respectively. The linear gears 13 and 14 engage with pinion type front and rear barrier opening and closing gears 15 and 16, respectively. The front and rear barrier opening and closing gears 15 and 16 are rotatably attached to the body 1 and the driven pulleys 17 and 18 are coaxially provided.

In this embodiment, like the first embodiment, the body 1 is provided with the rotary gear 10 and the left and right lens barrels 5 are provided with the linear gears 11. In addition, a driving pulley 19 is provided coaxially with the rotary gear 10. The driving pulley 19 and the driven pulleys 17 and 18 are interconnected by belts 20 and 21 to interlock with one another.

In the barrier driving mechanism structured as described above, in the housed condition of the lens barrels 5 shown in FIG. 7, the front and rear barriers 3 and 4 are arranged to face the corresponding objective lenses 6 and eyepieces 7 to shelter and protect these lenses 6 and 7. When the left and right lens barrels 5 are moved from this condition for pupil distance adjustment in a direction to increase the distance therebetween, the rotary gear 10 rotates counterclockwise, so that the rotation is transmitted from the driving pulley 19 through the belts 20 and 21 to rotate the barrier opening and closing gears 15 and 16 in the same direction. The rotations of the gears 15 and 16 are transmitted to the linear gears 13 of the barriers 3 and 4, so that the left and right barriers 3 and 4 are moved in a direction to decrease the distance therebetween to promptly retreat from the protecting positions which face the lenses 6 and 7.

In the used condition of the lens barrels 5, the barriers 3 and 4 are located at the retreated positions. However, when the left and right lens barrels 5 are moved in a direction to decrease the distance therebetween to change their condition from this condition to the housed condition, by operations performed in directions opposite to those of the used condition, the left and right barriers 3 and 4 are moved in a direction to increase the distance therebetween to return to the protecting positions which face the lenses 6 and 7.

Thus, this arrangement is employable for binoculars of large sizes since the barriers 3 and 4 arranged on the front and rear, on the left and right are moved in the inward direction by the outward movement of the left and right lens barrels 5.

Figure 9:
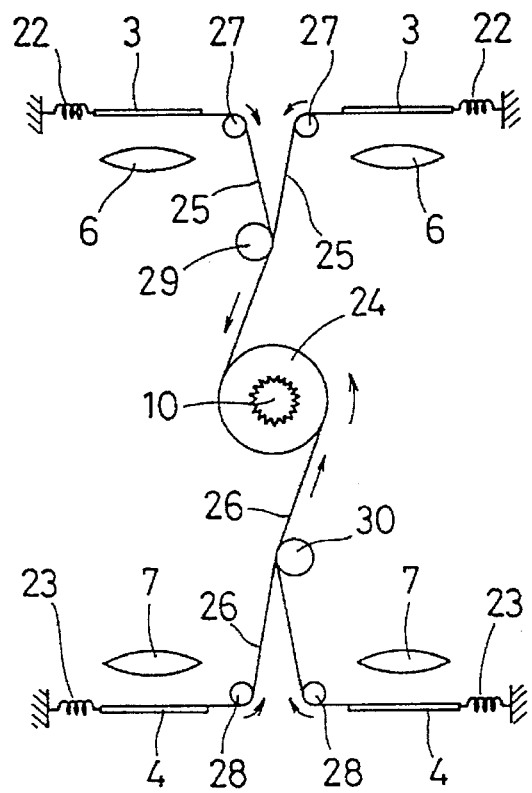
FIG. 9 is a schematic plan view showing a barrier driving mechanism in the housed condition of a binocular of a third embodiment of the present invention.
Figure 10:
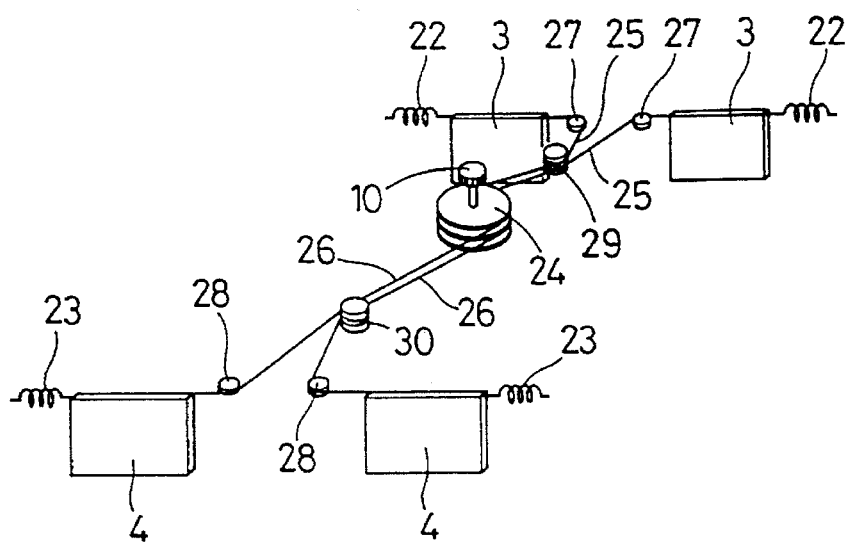
FIG. 10 is a schematic perspective view of the barrier driving mechanism of FIG. 9.

FIGS. 9 and 10 show the third embodiment of a binocular of the present invention. FIG. 9 shows a mode of the barriers 3 and 4 in the housed condition and FIG. 10 shows a barrier driving mechanism. In this embodiments, portions and elements having the same structures and workings as those of the first and second embodiments are identified by the same reference designations.

In this embodiment, the front and rear barriers 3 and 4 are formed to be separate from the body 1 and to independently correspond to the objective lenses 6 and the eyepieces 7 of the left and right lens barrels 5. By causing a total of four barriers 3 and 4 arranged at the front, rear, left and right to interlock with the movement of the left and right lens barrels 5 by a barrier driving mechanism structured as described below, the objective lens protecting barrier 3 and the eyepiece protecting barrier 4 are displaced substantially parallel to the optical axis together with the movement of the left and right optical systems to increase the distance therebetween. With this arrangement, if the size of the binocular is the same, the distance between the lens protecting position and the retreated position is smaller than those of the first and second embodiments.

The front and rear barriers 3 and 4 are made of an easily deformed material such as a rubber plate and are pulled outward, i.e. toward the sides of the protecting positions by tension springs 22 and 23 arranged between the outer ends of the barriers 3 and 4 and the body 1. The forces of the tension springs 22 and 23 are set to be smaller than the friction force between the lens barrel 5 and the body 1.

In this embodiment, like the first and second embodiments, the body 1 is provided with the rotary gear 10 and the left and right lens barrels 5 are provided with the linear gears 11. In addition, a winding pulley 24 is provided coaxially with the rotary gear 10. Belts 25 and 26 connects the winding pulley 24 and the central side ends of the barriers 3 and 4 to interlock with one another. Reference numerals 27 and 28 represent guiding pulleys for guiding the belts 25 and 26 and the barriers 3 and 4. Reference numerals 29 and 30 represent tension pulleys.

In the barrier driving mechanism structured described above, in the housed condition of the lens barrels 5 shown in FIG. 9, the barriers 3 and 4 on the front and rear, on the left and right face corresponding objective lenses 6 and eyepieces 7 to shelter and protect the lenses 6 and 7. When the left and right lens barrels 5 are moved from this condition for pupil distance adjustment in a direction to increase the distance therebetween, the rotary gear 10 rotates counterclockwise and the winding pulley 24 rotates in the same direction, i.e. in a direction to wind the belts 25 and 26. Thereby, the barriers 3 and 4 are pulled toward the center against the forces of the springs 22 and 23 through the belts 25 and 26, and are guided by the guiding pulleys 27 and 28 to change their directions, so that they are pulled toward the winding pulleys 24 to be promptly retreated from the protecting positions where the barriers 3 and 4 face the lenses 6 and 7.

In the used of the lens barrels 5, the barriers 3 and 4 are located at the retreated positions. When the left and right lens barrels 5 are moved in a direction to decrease the distance therebetween to bring them in the housed condition, by operations performed in directions opposite to those of the used condition, the left and right barriers 3 and 4 located at the retreated positions are returned to the protecting positions by the forces of the springs 22 and 23.

Thus, in the third embodiment, since the barriers 3 and 4 are position-displaced to be substantially parallel to the optical axis while moving so as to enter the central portion of the body 1 by the outward movements of the left and right lens barrels 5, this arrangement is employable for binoculars of larger sizes than those of the first and second embodiments.

In the first to third embodiments, the barrier driving mechanism may be modified in various ways as far as the barriers 3 and 4 are opened and closed in response to the condition change between the housed and the retreated conditions.

While in the above-described embodiments, the left and right optical systems which are the objective lenses and the eyepieces are all sheltered by the barriers, according to the configuration of the binocular, for example when the objective lens side of the binocular is enclosed in a hood-like member, no protecting member is necessary. In that case, the protecting member of the present invention is employed only for the side of the eyepiece.

Figure 15:
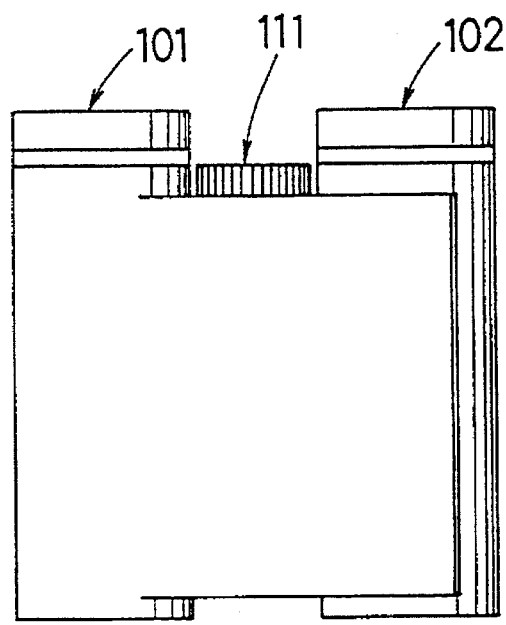
FIG. 15 is a plan view showing the exterior of the binocular when the distance between the left and right lens barrels is minimum.
Figure 16:
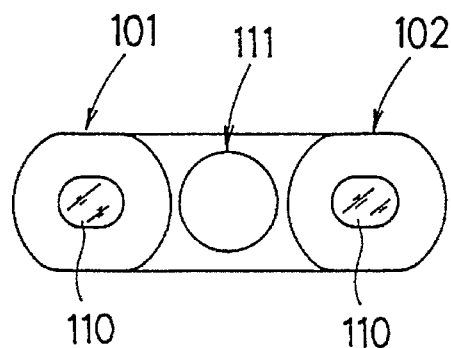
FIG. 16 is a front view of FIG. 15.
Figure 17:
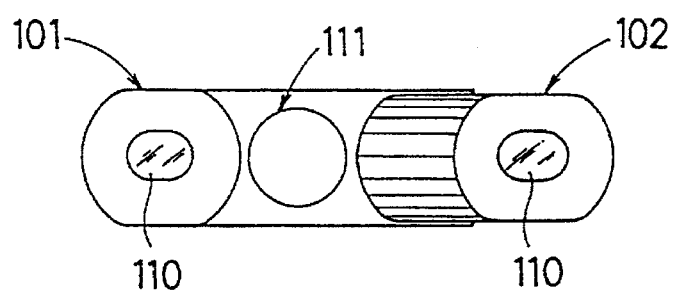
FIG. 17 is a front view showing a condition where the distance between the left and right lens barrels is maximum.

Hereinafter, a fourth embodiment of the present invention will be described. FIGS. 11 to 21B show the fourth embodiment. FIGS. 11 to 14 show its cross-sectional structure. FIGS. 15 to 17 show its exterior. In FIGS. 11 to 17, reference numerals 101 and 102 represent left and right lens barrels, respectively. The lens barrel 101 is fixed and the lens barrel 102 is formed to be linearly movable relative to the lens barrel 101 in the horizontal direction so that the distance with the lens barrel 101 is increased or decreased.

Figure 18:
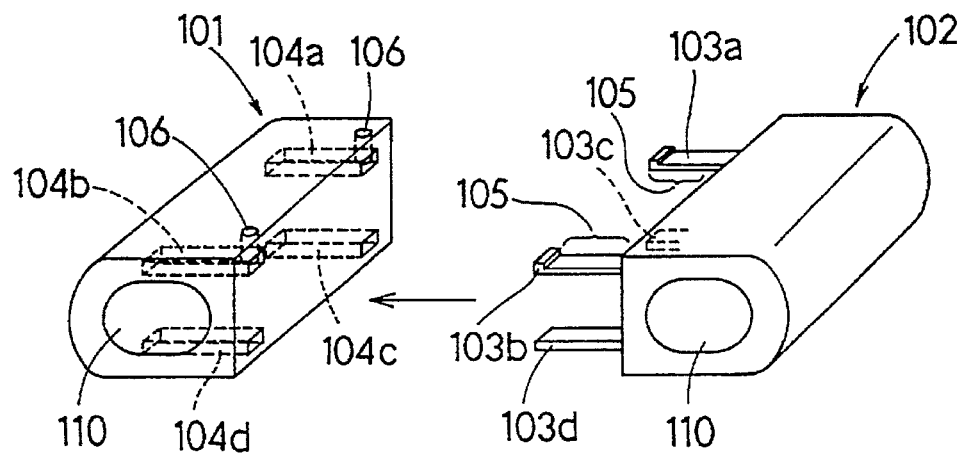
FIG. 18 is an exploded perspective view showing the left and right lens barrels.

FIG. 18 is an exploded view of the fixed lens barrel 101 and the movable lens barrel 102. As shown in FIGS. 11 to 14 and 18, several guiding rods (four in FIG. 14) $103_a$, $103_b$, $103_c$ and $103_d$ are formed to protrude from a side surface of the movable lens barrel 102. At positions on the fixed lens barrel 101 which face the guiding rods $103_a$, $103_b$, $103_c$ and $103_d$, guiding holes $104_a$, $104_b$, $104_c$ and $104_d$ into which the guiding rods $103_a$, $103_b$, $103_c$ and $103_d$ are slidingly inserted are formed.

Figure 11:
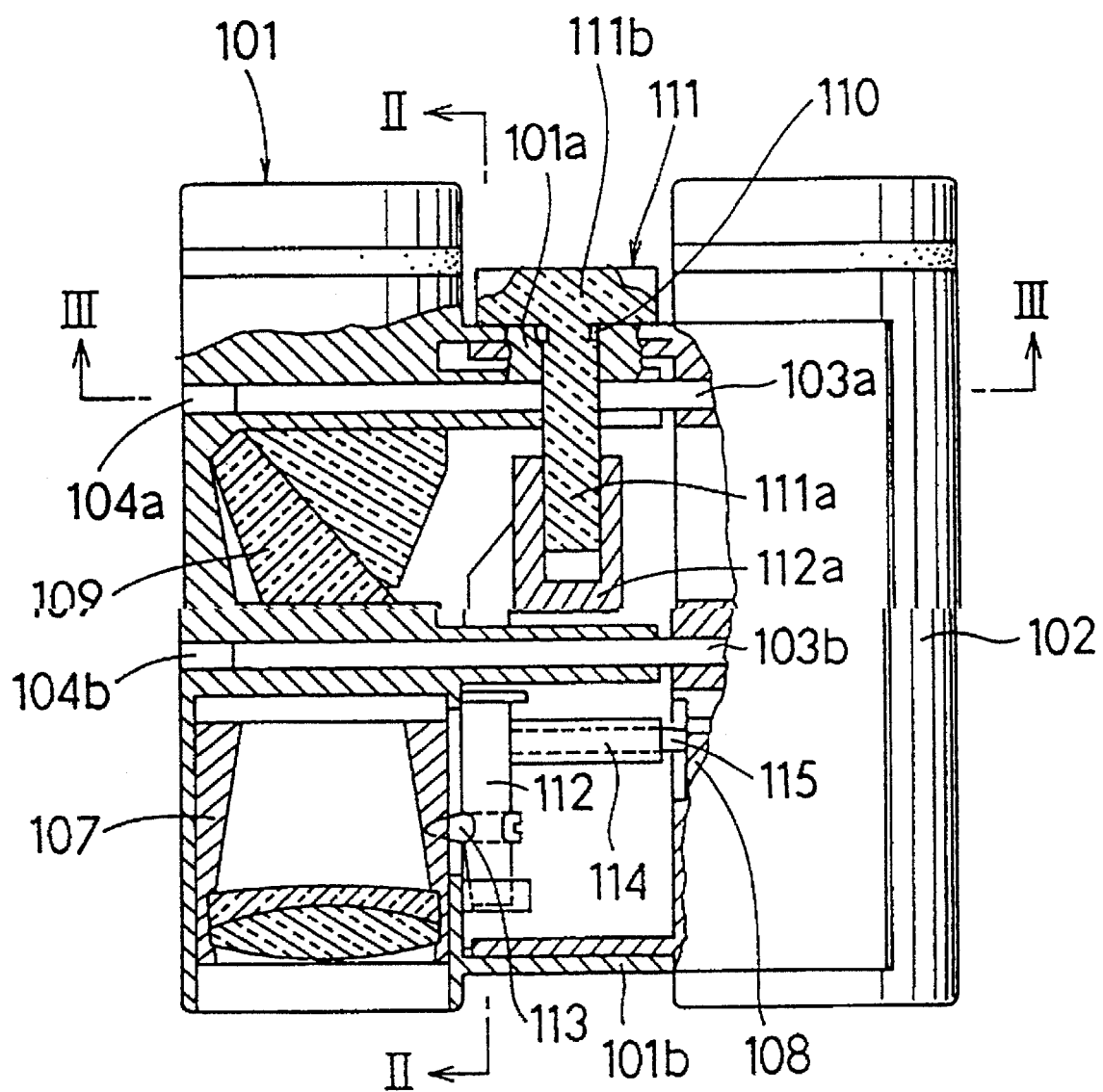
FIG. 11 is a partly-broken plan view showing a condition where the distance between left and right lens barrels of a binocular of a fourth embodiment of the present invention is minimum.
Figure 12:
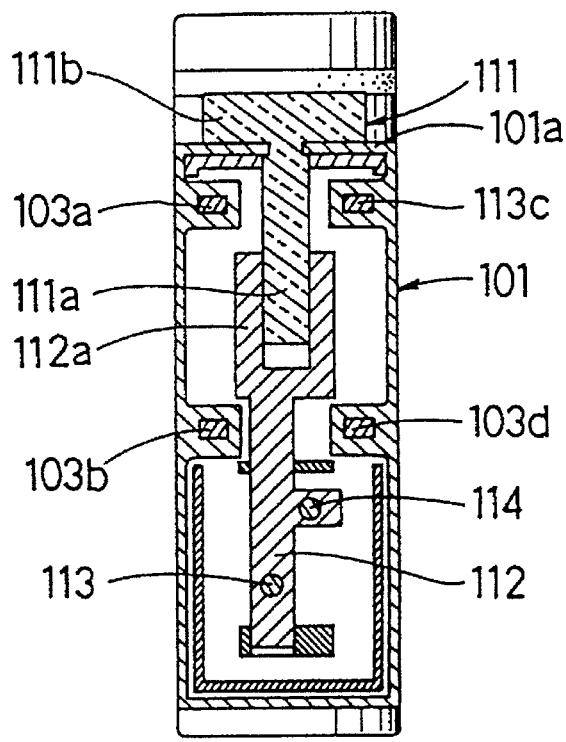
FIG. 12 is a cross-sectional view taken on line II—II of FIG. 11.
Figure 13:
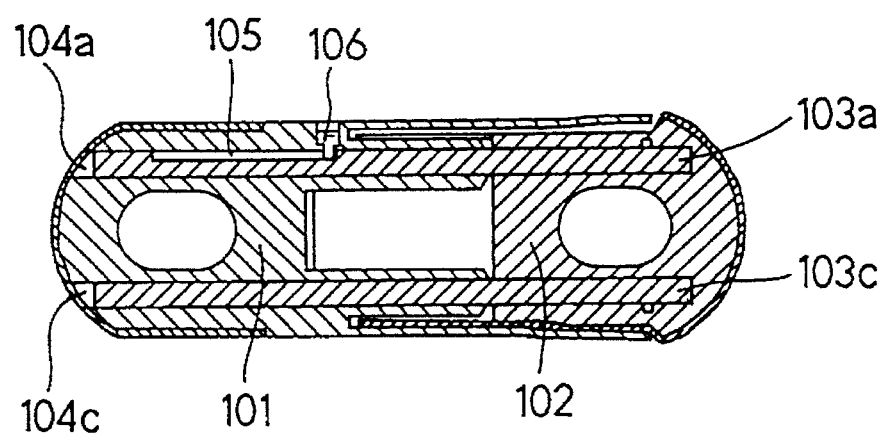
FIG. 13 is a cross-sectional view taken on line III—III of FIG. 11.
Figure 14:
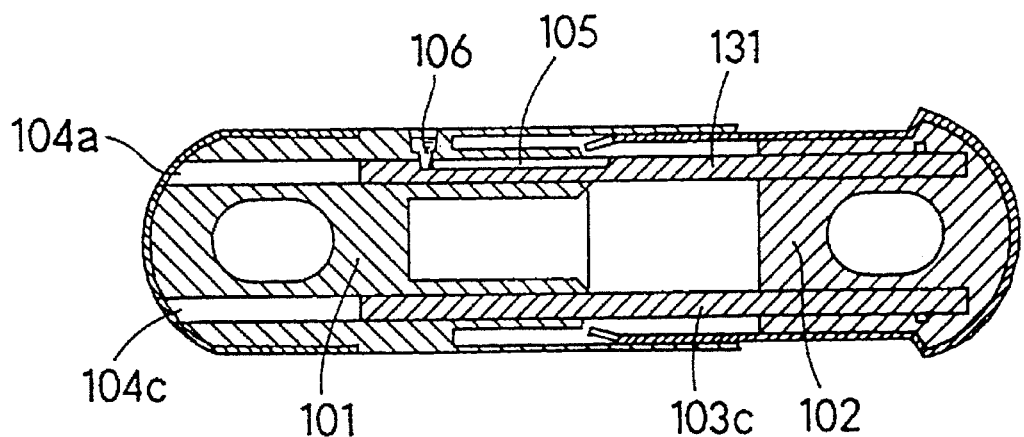
FIG. 14 is a cross-sectional view corresponding to FIG. 13, showing a condition where the distance between the left and right lens barrels is maximum.

Of the guiding rods $103_a$, $103_b$, $103_c$ and $103_d$, at least one rod (two rods in the figures) has a key groove 105 formed thereon. At open ends of the guiding holes $104_a$ and $104_b$ of the fixed lens barrel 101 corresponding to the guiding rods $103_a$ and $103_b$ each having the key groove 105 formed thereon, pins 106 are provided to protrude toward the guiding holes $104_a$ and $104_b$. By engaging the key grooves 105 of the movable lens barrel 102 and the pins 106 of the fixed lens barrel 101, the movable lens barrel 102 is parallely moved leftward and rightward while the optical axes of the left and right lens barrels 101 and 102 are maintained parallel. In FIG. 11, reference numerals 107 and 108 represent objective lens units provided at the front of the lens barrels 101 and 102, and reference numeral 109 represents a prism. In FIGS. 16 and 17, reference numeral 110 represents an eyepiece.

Figure 19A:
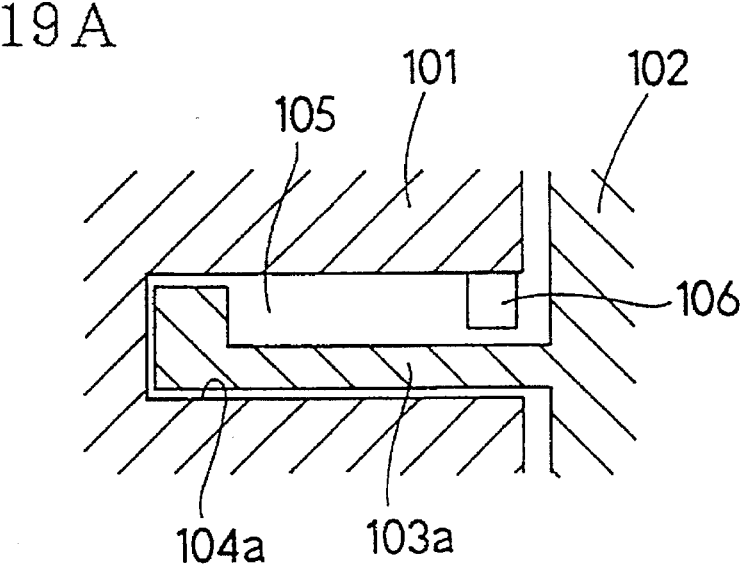
FIGS. 19A and 19B are enlarged cross-sectional views showing the change of coupling condition of the left and right lens barrels.

When the binocular is not used, the distance between the fixed lens barrel 101 and the movable lens barrel 102 is minimum as shown in FIGS. 11, 13, 15 and 16. In this case, as shown in FIG. 19A, the guiding rods $103_a$, $103_b$, $103_c$ and $103_d$ of the movable lens barrel 102 are inserted into the guiding holes $104_1$, $104_2$, $104_3$ and $104_4$ of the fixed lens barrel 101 to their ends.

Figure 19B:
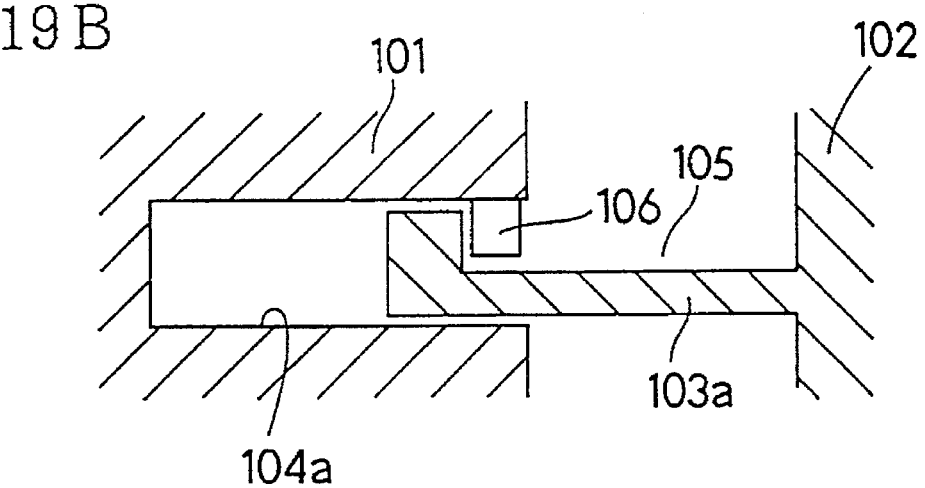

When the pupil distance is adjusted, by holding the lens barrels 101 and 102 with the left and right hands and moving them so that the distance therebetween increases, the movable lens barrel 102 is estranged from the fixed lens barrel 101. At this time, by arranging so that the guiding rods $103_a$, $103_b$, $103_c$ and $103_d$ of the movable lens barrel 102 can slide in the guiding holes $104_a$, $104_b$, $104_c$ and $104_d$ of the fixed lens barrel 101 while closely engaging therewith, the horizontal movement of the lens barrels 101 and 102 is smoothly made. FIG. 19B shows a condition where the guiding rods $103_a$, $103_b$, $103_c$ and $103_d$ are drawn out from the guiding holes $104_a$, $104_b$, $104_c$ and $104_d$ to the maximum.

Thus, since the guiding rods $103_a$, $103_b$, $103_c$ and $103_d$ are provided with the key grooves 105 for restricting the stroke length and the pins 106 protruding from the fixed lens barrel 101 are inserted into the key grooves 105, the both ends of the key grooves 105 abut the pins 106 to prevent the lens barrels 101 and 102 from being detached and to restrict the stroke length in adjusting the pupil distance.

While in this embodiment, four guiding rods $103_a$, $103_b$, $103_c$ and $103_d$ are provided only to the fixed lens barrel 101 and the movable lens barrel 102 is provided with only the guiding holes $104_a$, $104_b$, $104_c$ and $104_d$, by providing at least two guiding rods, the shake of the lens barrels 101 and 102 in the parallel movement can be prevented. Moreover, several guiding rods may be provided to each of the lens barrels 101 and 102. In this case, guiding holes are provided to correspond to the guiding rods.

Returning to FIGS. 11 and 12, supporting walls 101a and 101b which extend toward the movable lens barrel 102 are integrally formed at the front and rear ends of the fixed lens barrel 101, and a focus ring 111 serving as a focusing operation member is rotatably attached to a hole 110 formed in the supporting wall 101a so as not to move backward and forward.

The focus ring 111 includes an operation ring 111b provided to an end of a screw shaft 111a. The screw shaft 111a is screwed into a screw hole $112_a$ formed at the base end of a lead shaft 112. By rotating the operation ring 111b with fingers, the lead shaft 112 is moved backward and forward parallel to the optical axis. The other end of the lead shaft 112 is fixed to the objective lens unit 107 of the fixed lens barrel 101 through a rod 113 and to a tube 114. A rod 115 extending from the objective lens unit 108 of the movable lens barrel 102 is fitted to the tube 114 to be slidable leftward and rightward.

Figure 20A:
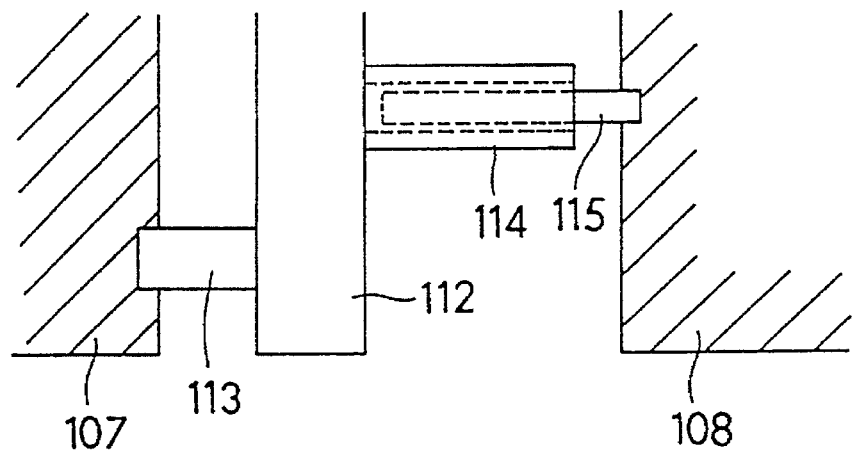
FIGS. 20A and 20B are enlarged cross-sectional views showing the change of coupling condition of the left and right lens barrels.
Figure 20B:
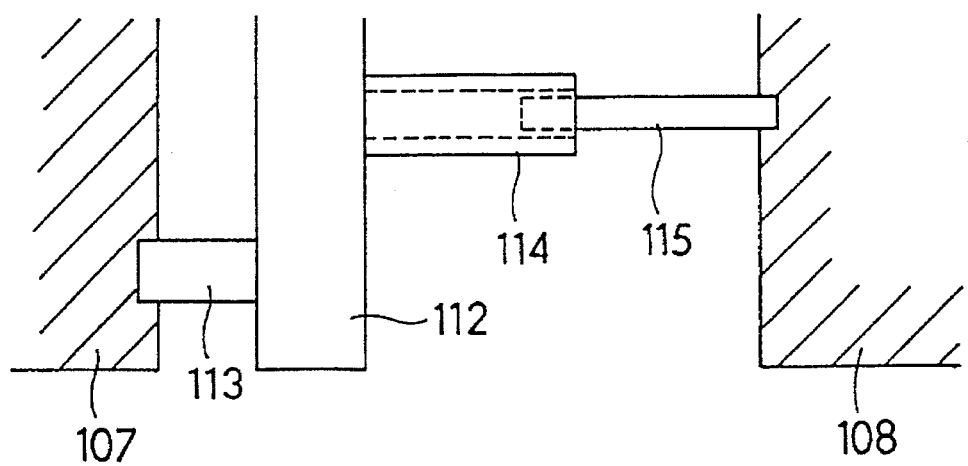

When the binocular is not used, as shown in FIG. 20A, the rod 115 of the objective lens unit 108 is deeply inserted in the tube 114 of the lead shaft 112. Moreover, as shown in FIG. 20B, when the movable lens barrel 102 is moved away from the fixed lens barrel 101 for adjusting the pupil distance, the rod 115 is largely drawn out from the tube 114. In any case, the coupling between the objective lens unit 108 of the movable lens barrel 102 and the lead shaft 112 is maintained.

In the focusing mechanism structured as described above, when the operation ring 111b of the focus ring 111 is rotated to move the lead shaft 112 backward and forward, together with this movement, the objective lens units 107 and 108 move backward and forward relative to the eyepieces 110. Thereby, focusing is performed. It does not matter much that a member (not shown) for focusing between the left and right optical systems, typically called the adjustment of dioptric power, cannot be executed both from the front and from the rear, since it is much less frequently used than the focus ring 111.

In the above-described arrangement, according to this embodiment, in the entire movement range of the movable lens barrel 102 from the non-used condition to the limit position of the pupil distance adjustment, the external configuration of the entire binocular including the focus ring 111 and the operation ring 111b is substantially symmetrical with respect to the center line in the vertical direction, so that there is no difference in external configuration between on the top and on the bottom.

Figure 21A:
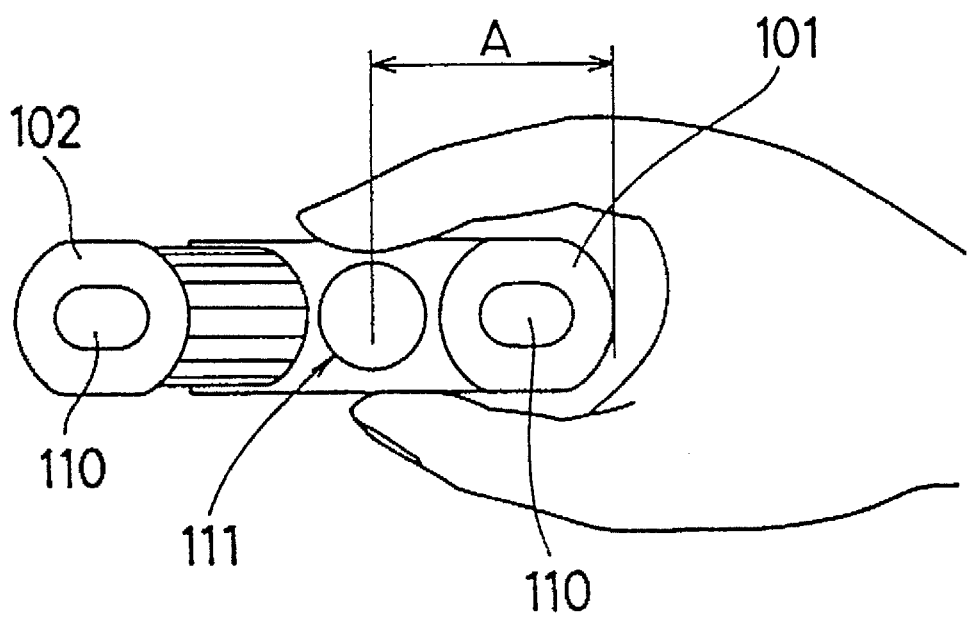
FIGS. 21A and 21B are front views showing the change of condition of use according to whether the user is right-handed or left-handed.
Figure 21B:
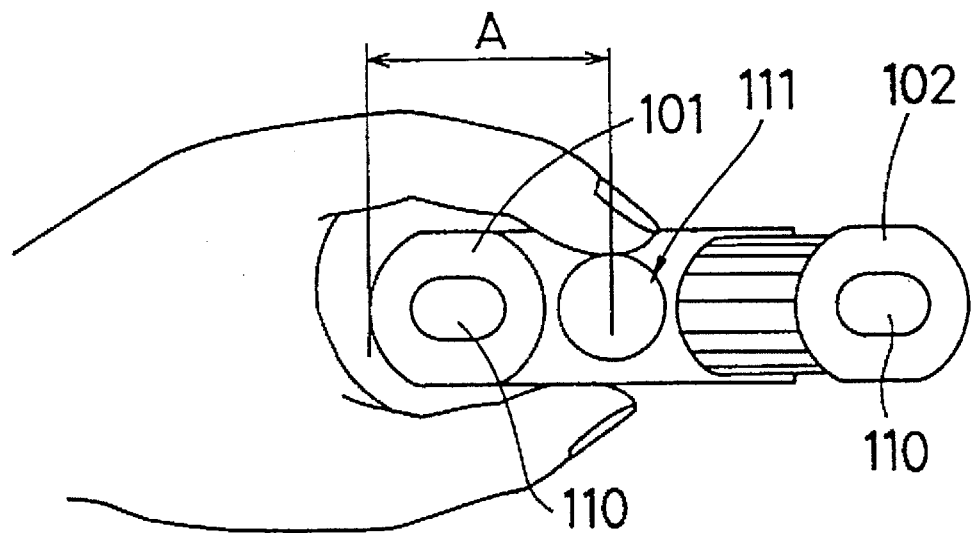

Thus, in using the binocular, if the binocular is surely held from the sides of the lens barrels 101 and 102, i.e. when a right-handed person uses the binocular, if the binocular is held so that the fixed lens barrel 101 is located on the right side as shown in FIG. 21A, the focus ring 111 is located at the distance A from the bases of the fingers. When a left-handed person uses the binocular, if the binocular is turned upside down from the position for right-handed persons to hold it, since the fixed lens barrel 101 is located on the left side as shown in FIG. 21B, the focus ring 111 can be operated in the same way as that of the case of the right-handed person.

Thus, according to the fourth embodiment, since the distance A between the bases of the fingers and the focus ring 111 is the same whether the binocular is held with the right hand or the left hand, an excellent operability is realized irrespective of the hand with which the binocular is held and the pupil distance. Moreover, since the hand does not interfere with the movable lens barrel 102, the strength between the lens barrels 101 and 102 can be reduced. As a result, the manufacture cost is reduced. Further, in the case of a small size binocular designed to hold with one hand, by holding the binocular from the side of the fixed lens barrel 101, the movable lens barrel 102 which slides is not touched by the hand, so that the necessary strength between the fixed lens barrel 101 and the movable lens barrel 102 can also be reduced in this case.

Hereinafter, a fifth embodiment of the present invention will be described with reference to the drawings. This embodiment is a so-called horizontally-moved binocular where a focusing operation member is arranged in one lens barrel and the other lens barrel is linearly movable in a direction perpendicular to the optical axis relative to the one lens barrel. FIGS. 22 to 26 shows its housed condition. FIG. 27 shows the left and right lens barrels. FIGS. 28 to 31 show its used condition. In these figures, reference numerals 201 and 202 represent left and right lens barrels constituting the body of the binocular. The lens barrel 201 is fixed and the lens barrel member 102 is linearly movable in the horizontal direction relative to the lens barrel 201 so that the distance with the lens barrel 201 decreases or increases.

Figure 28:
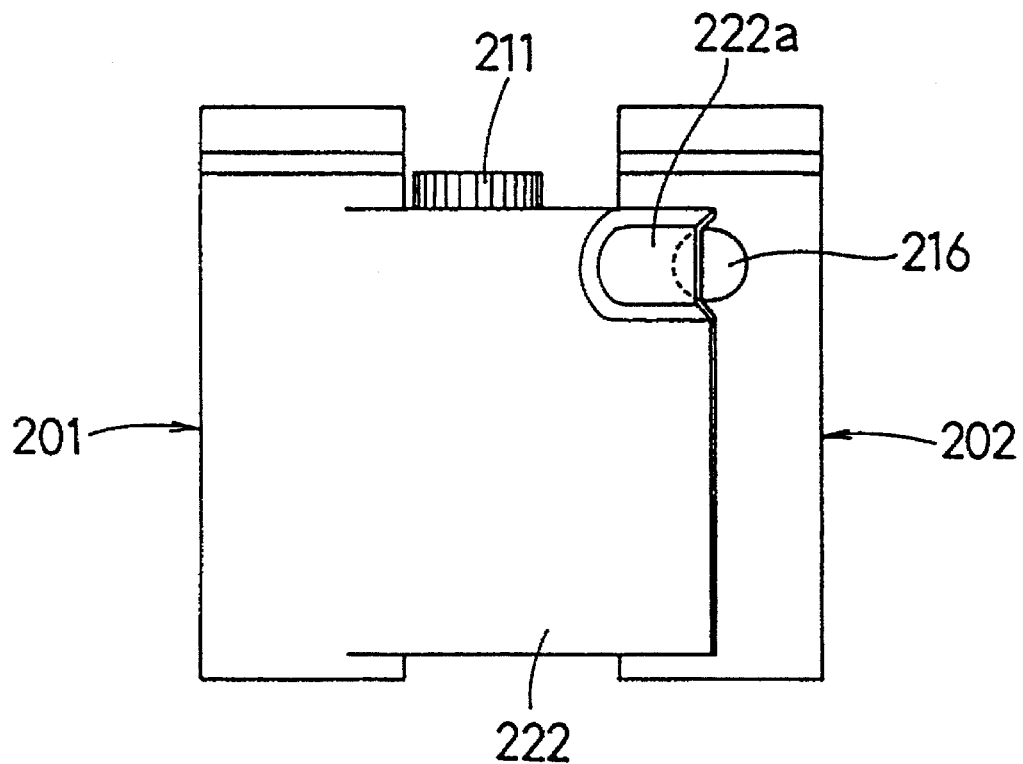
FIG. 28 is a plan view showing a used condition where the distance between the left and right lens barrels is half the maximum distance.
Figure 29:
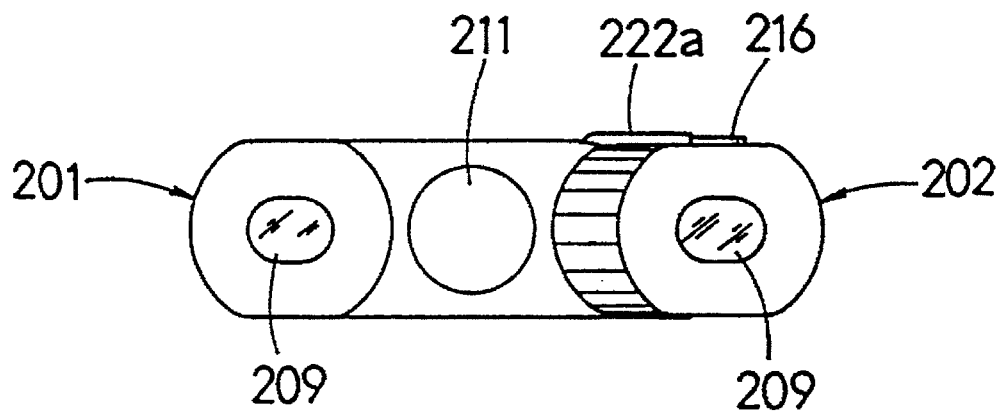
FIG. 29 is a front view of FIG. 28.
Figure 30:
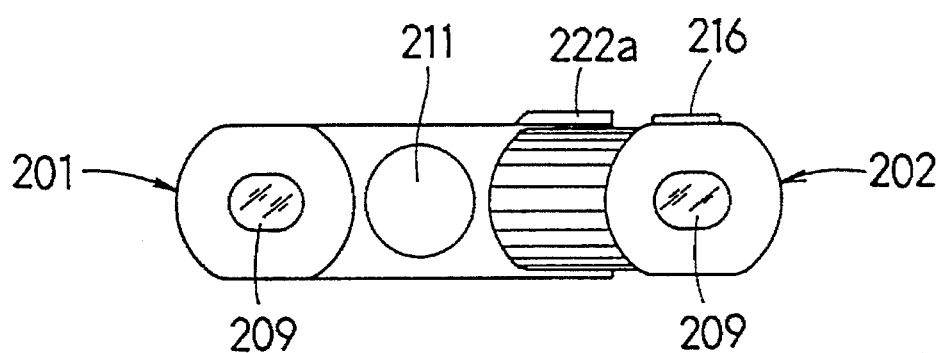
FIG. 30 is a front view showing a used condition where the distance between the left and right lens barrels is maximum.
Figure 31:
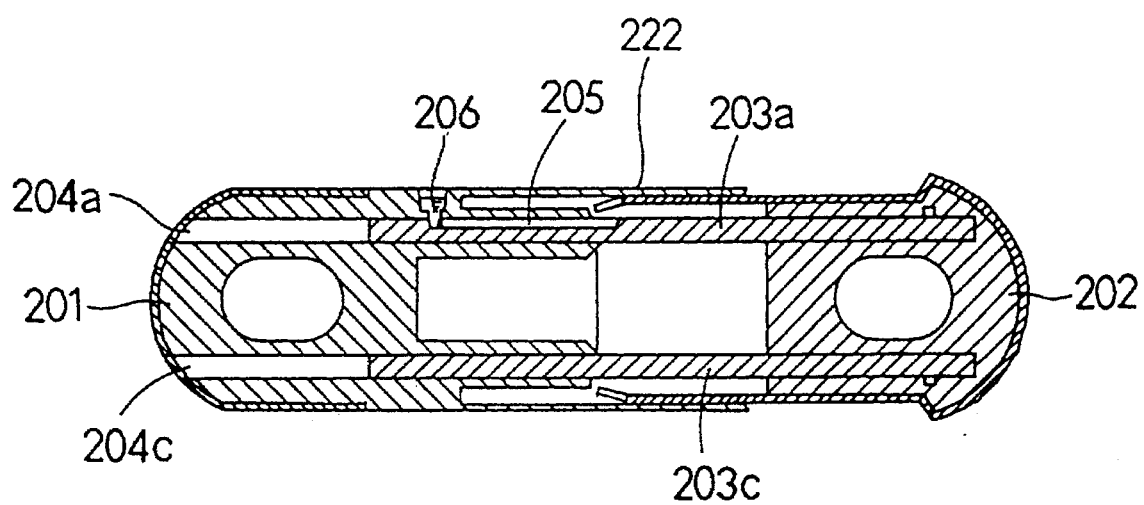
FIG. 31 is a cross-sectional view of FIG. 30 corresponding to FIG. 26.

By moving the movable lens barrel 202, the condition of the binocular body constituted by the left and right lens barrels 201 and 202 can be changed between the housed condition where the distance between the left and right lens barrels 201 and 202 is minimum and the maximum pupil distance condition where the distance between the left and right lens barrels 201 and 202 is maximum as shown in FIG. 30. The pupil distance adjustment in the used condition can be performed between these conditions as illustrated in FIGS. 28 and 29.

Figure 24:
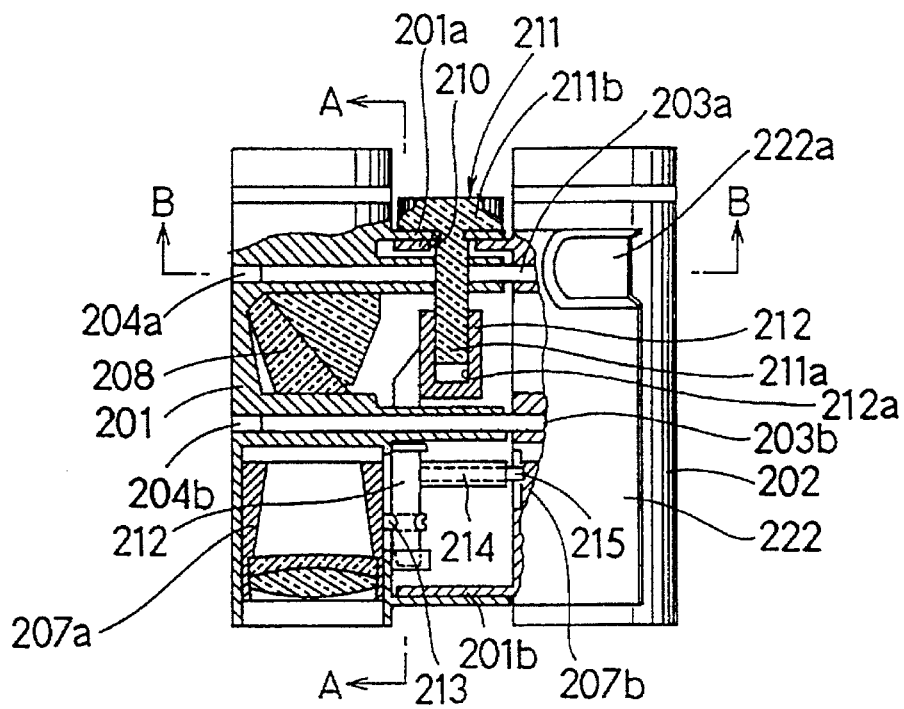
FIG. 24 is a partly-broken plan view showing the housed condition.
Figure 25:
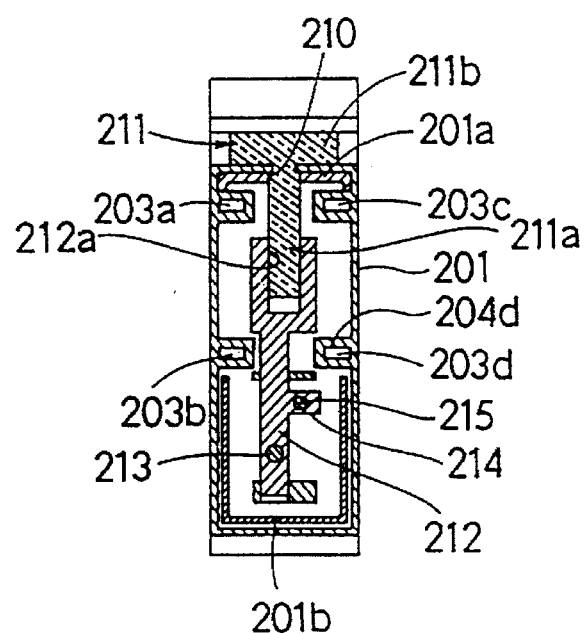
FIG. 25 is a cross-sectional view taken on line A—A of FIG. 24.
Figure 26:
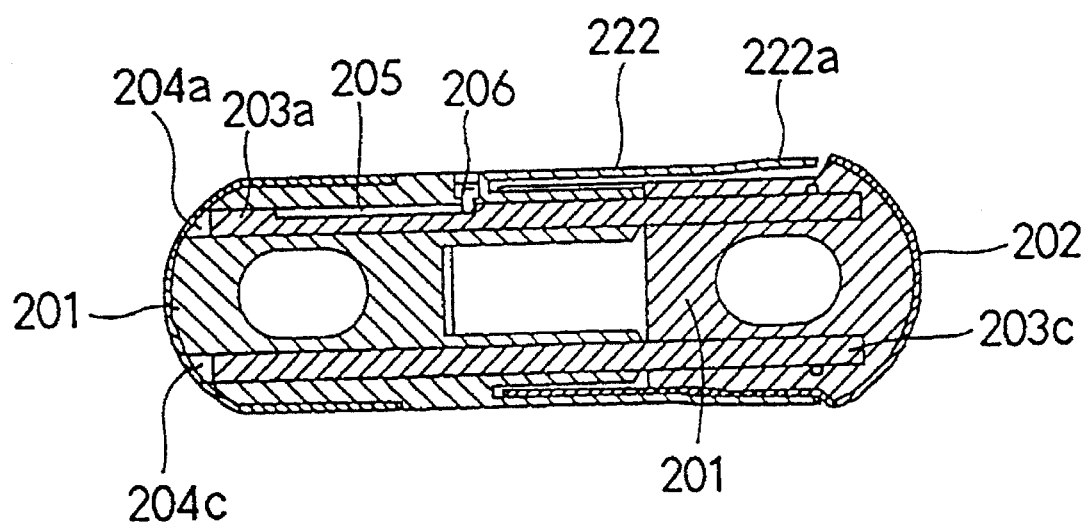
FIG. 26 is a cross-sectional view taken on line B—B of FIG. 24.
Figure 27:
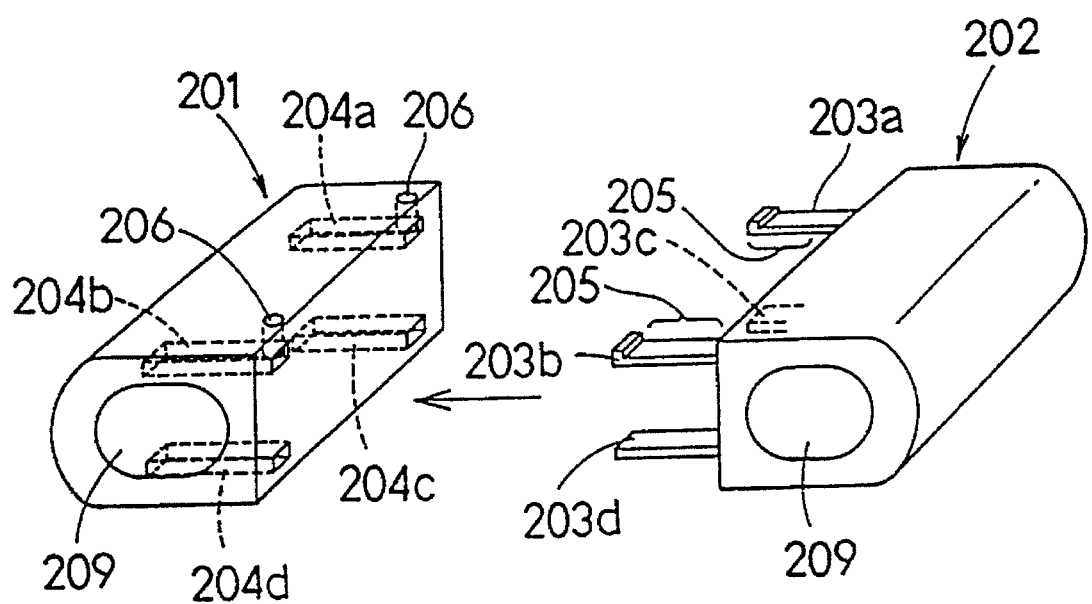
FIG. 27 is an exploded perspective view showing the left and right lens barrels.

As shown in the cross-sectional views of FIGS. 24 to 26 and in the exploded view of FIG. 27, several guiding rods (four in this embodiment) 203a, 203b, 203c and 203d are formed to protrude from a side surface of the movable lens barrel 202. At positions on the fixed lens barrel 201 which face the guiding rods 203a, 203b, 203c and 203d, guiding holes 204a, 204b, 204c and 204d into which the guiding rods 203a, 203b, 203c and 203d are slidingly fitted are formed.

Of the guiding rods 203a, 203b, 203c and 203d, at least one rod (two rods in the figures) has a key groove 205 formed thereon. At open ends of the guiding holes 204a and 204b of the fixed lens barrel 201 corresponding to the guiding rods 203a and 203b each having the key groove 205 formed thereon, pins 206 are provided to protrude toward the guiding holes 204a and 204b. By engaging the key grooves 205 of the movable lens barrel 202 and the pins 206 of the fixed lens barrel 201, the movable lens barrel 202 is moved leftward and rightward in the horizontal direction while the optical axes of the left and right lens barrels 201 and 202 are maintained parallel.

While the key grooves 205 are each formed to have a configuration, for example, obtained by flatly cutting the upper half of the guiding rods 203a and 203b having square cross sections and their lengths are at least the same as or slightly longer than the maximum pupil distance adjustment range, they are not limited thereto.

Figure 32A:
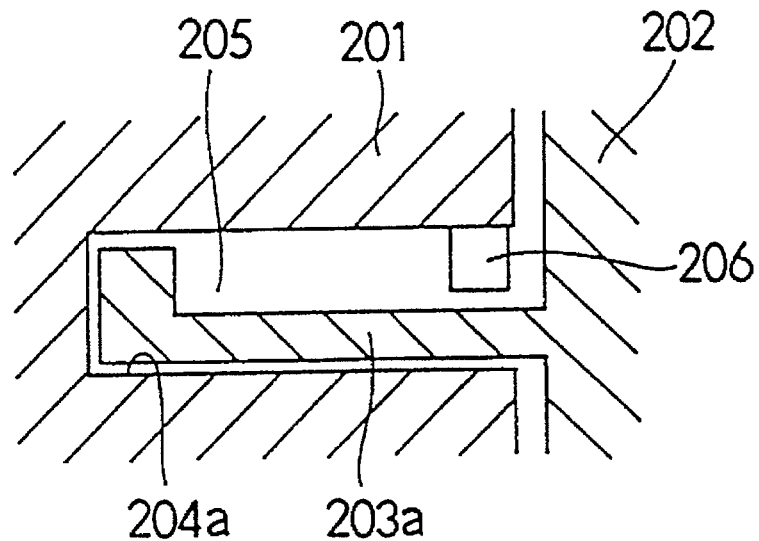
FIGS. 32A and 32B are enlarged cross-sectional views showing a change of coupling condition of the left and right lens barrels.

When the binocular is not used, the distance between the fixed lens barrel 201 and the movable lens barrel 202 is minimum as shown in FIGS. 22 to 26. In this case, as shown in FIG. 32A, the guiding rods 203a, 203b, 203c and 203d of the movable lens barrel 202 are inserted into the guiding holes 204a, 204b, 204c and 204d of the fixed lens barrel 201 to their ends.

Figure 32B:
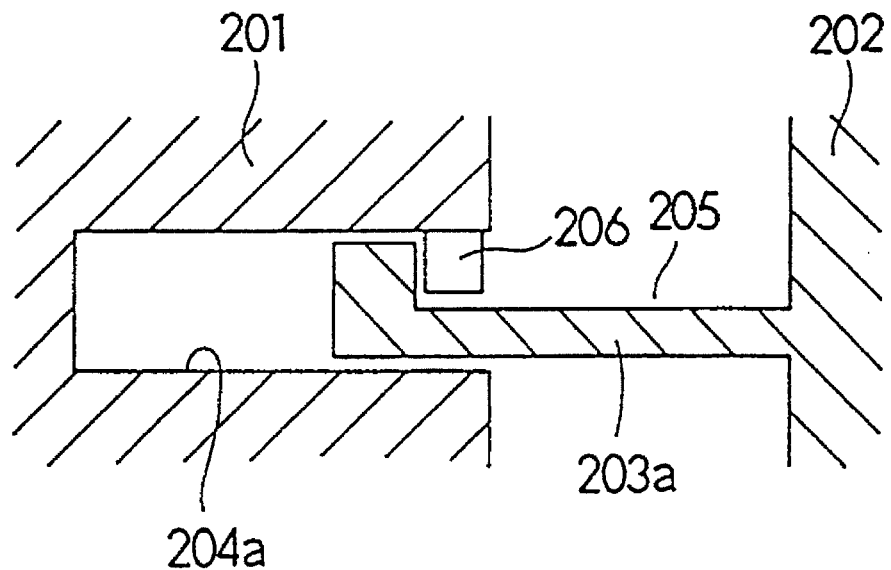

When the pupil distance is adjusted, by holding the lens barrels 201 and 202 with the left and right hands and moving them so that the distance therebetween increases, the movable lens barrel 202 is estranged from the fixed lens barrel 201. At this time, by arranging so that the guiding rods 203a, 203b, 203c and 203d of the movable lens barrel 202 can slide in the guiding holes 204a, 204b, 204c and 204d of the fixed lens barrel 201 while closely engaging therewith, the horizontal movement of the lens barrels 201 and 202 is smoothly made. FIG. 32B shows a condition where the guiding rods 203a, 203b, 203c and 203d are drawn out from the guiding holes 204a, 204b, 204c and 204d to the maximum.

Thus, since the guiding rods 203a, 203b, 203c and 203d are provided with the key grooves 205 for restricting the stroke width and the pins 206 protruding from the fixed lens barrel 201 are inserted into the key grooves 205, the both ends of the key grooves 205 abut the pins 206 to prevent the lens barrels 201 and 202 from being detached and to restrict the stroke width in adjusting the pupil distance.

While in this embodiment, four guiding rods 203a, 203b, 203c and 203d are provided only to the fixed lens barrel 201 and the movable lens barrel 202 is provided with only the guiding holes 204a, 204b, 204c and 204d, by providing at least two guiding rods, the shake of the lens barrels 201 and 202 in the horizontal movement can be prevented when the lens barrel 202 is moved in the horizontal direction.

Moreover, several guiding rods may be provided to each of the lens barrels 201 and 202. In this case, guiding holes are provided to correspond to the guiding rods.

Returning to FIGS. 22 to 26, 207a and 207b represent objective lens units provided at the front of the lens barrels 201 and 202, 208 represents a prism, and 209 represents an eyepiece. Further, supporting walls 201a and 201b which extend toward the movable lens barrel 202 are integrally formed at the front and rear ends of the fixed lens barrel 201, and a focus ring 211 is rotatably attached to a hole 210 formed in the supporting wall 201a so as not to move backward and forward.

The focus ring 211 includes an operation ring 211b attached to an end of a screw shaft 211a. The screw shaft 211a is screwed into a screw hole 201 formed at the base end of a lead shaft 212. By rotating the operation ring 211b with fingers, the lead shaft 212 is moved backward and forward parallel to the optical axis. The other end of the lead shaft 212 is fixed to the objective lens unit 207a of the fixed lens barrel 201 through a rod 213 and to a tube 214. A rod 215 extending from the objective lens unit 207b of the movable lens barrel 202 is fitted to the tube 214 to be slidable leftward and rightward.

Figure 33A:
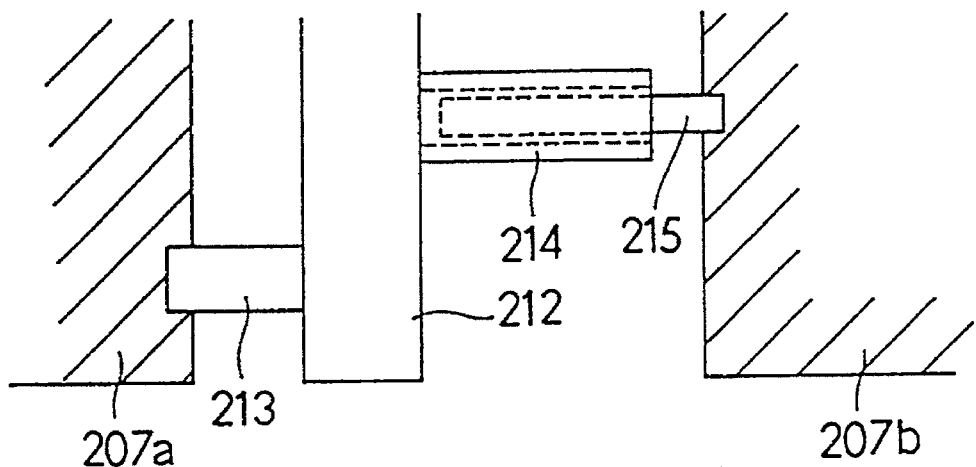
FIGS. 33A and 33B are enlarged cross-sectional views showing another change of coupling condition of the left and right lens barrels.
Figure 33B:
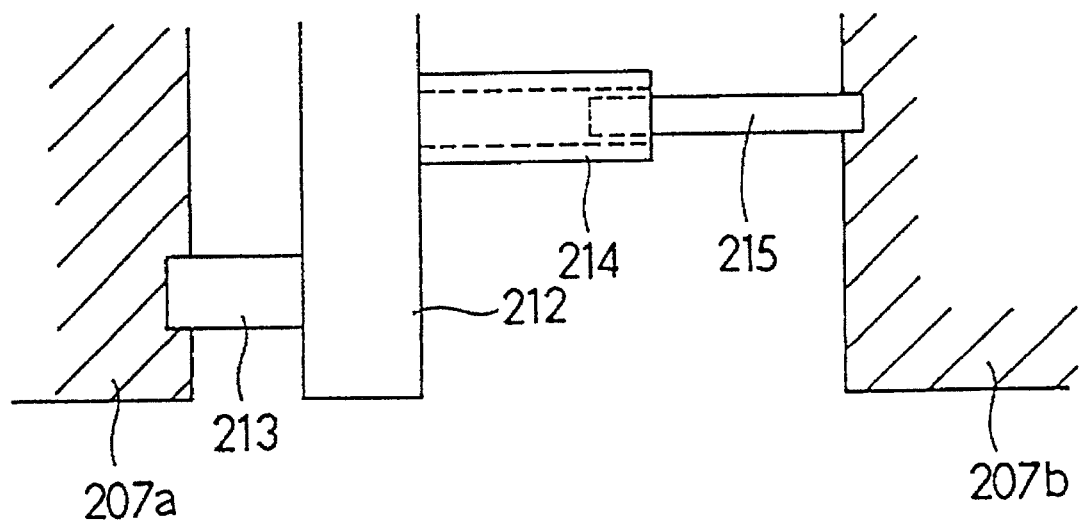

When the binocular is not used, as shown in FIG. 33A, the rod 215 of the objective lens unit 207b is inserted in the tube 214 of the lead shaft 212. Moreover, as shown in FIG. 33B, when the movable lens barrel 202 is moved away from the fixed lens barrel 201 for adjusting the pupil distance, the rod 215 is largely drawn out from the tube 214. In any cases, the coupling between the objective lens unit 207b of the movable lens barrel 202 and the lead shaft 212 is maintained.

In the focusing mechanism structured as described above, when the operation ring 211b of the focus ring 211 is rotated to move the lead shaft 212 backward and forward, together with this movement, the objective lens units 207a and 207b move backward and forward relative to the eyepieces 209. Thereby, focusing is performed.

In the above-described arrangement, according to this embodiment, by providing a dioptric power adjustment disabling means for surely disabling the focusing operation between the left and right optical systems, typically called dioptric adjustment in the housed condition and for enabling the dioptric power adjustment to be freely performed in the used condition, it is prevented that the dioptric power adjusting mechanism is inadvertently operated when the binocular is not used to accidentally change the dioptric power.

Figure 34:
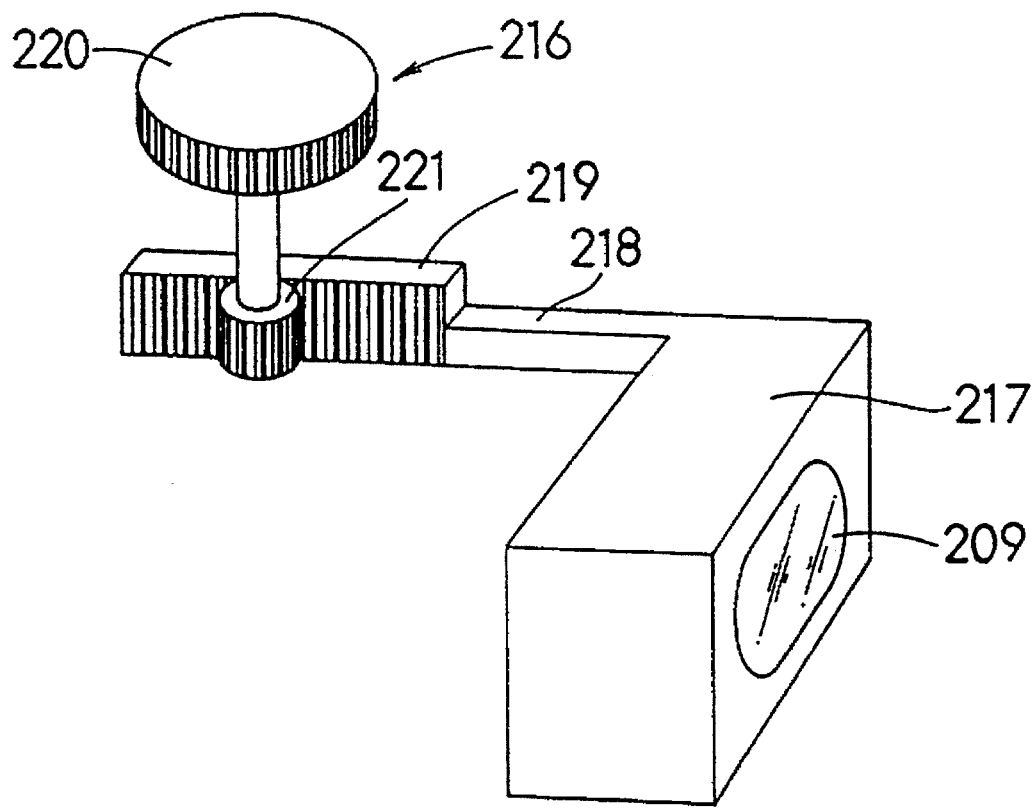
FIG. 34 is a perspective view schematically showing the dioptric power adjusting mechanism.

Referring to FIG. 34, the dioptric power adjusting mechanism of this embodiment is incorporated in the movable lens barrel 202. The dioptric power is adjusted by rotating a dioptric power adjusting ring 216 serving as an operation member to move the eyepiece 209 backward and forward along the optical axis. The eyepiece 209 is held by an eyepiece holding frame 217. The eyepiece holding frame 217 has a gear holder 218 extending forward from a side thereof. A linear gear 219 is formed integrally with the gear holder 218.

The dioptric power adjusting ring 216 is provided with a knob 220 protruding from the upper surface of the movable lens barrel 202, and a circular gear 221 is provided coaxially with the knob 220. The circular gear 221 is always engaged with the linear gear 219 of the eyepiece holding frame 217. Thereby, when the knob 220 is rotated, the rotation of the circular gear 221 is converted to a backward and forward straight movement of the linear gear 219, so that the eyepiece holding frame 217 is moved along the optical axis by being guided by a non-illustrated guide to adjust the dioptric power.

The dioptric power adjustment disabling means is provided in the fixed lens barrel 201 to mechanically disable the operation of the dioptric power adjusting ring 216 in the housed condition of the left and right lens barrels 201 and 202. The dioptric power adjustment disabling means operates to disable the dioptric power adjusting operation by covering the dioptric power adjusting ring 216 in the housed condition of the binocular body.

Figure 22:
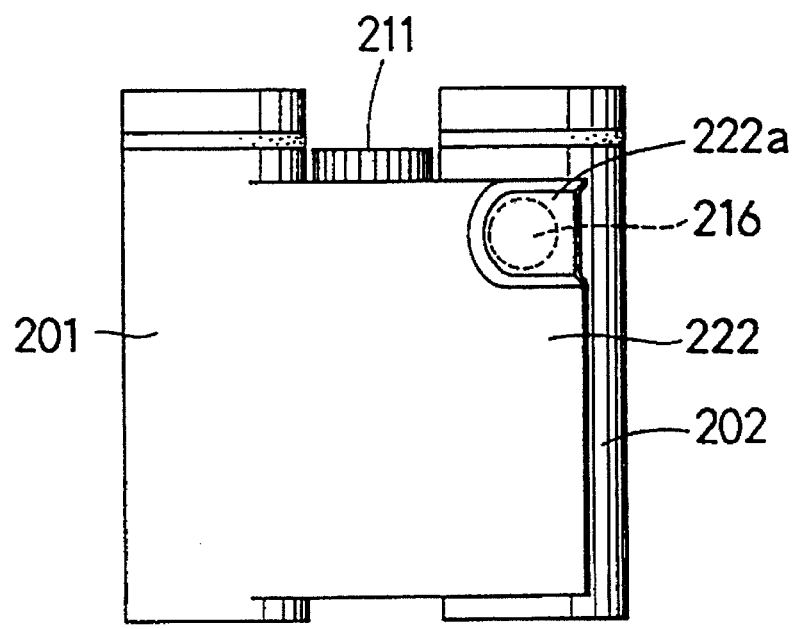
FIG. 22 is a plan view showing the exterior of a binocular of a fifth embodiment of the present invention in a housed condition.
Figure 23:
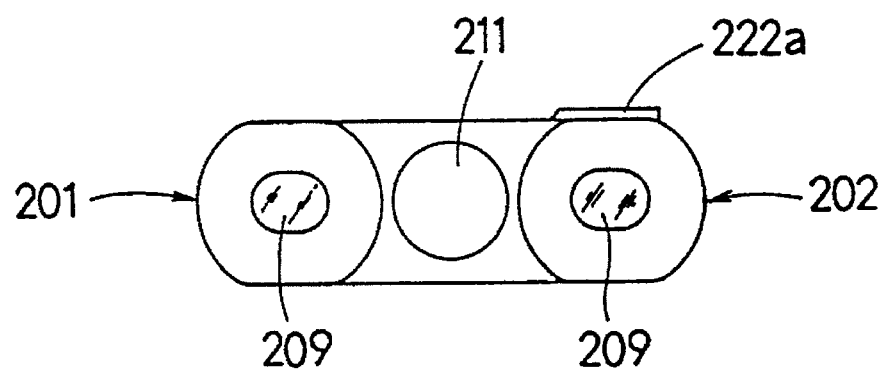
FIG. 23 is a front view of the binocular of FIG. 22.

Specifically, on the upper surface of the fixed lens barrel 201, a cover 222 of square plate form extending toward the movable lens barrel 202 is integrally provided. As shown in FIGS. 22 to 24, the cover 222 is formed to have dimensions capable of covering more than the half of the movable lens barrel 202 along its diameter in the housed condition where the distance between the fixed lens barrel 201 and the movable lens barrel 202 is minimum. The knob 220 of the dioptric power adjusting ring 216 is arranged within an area on the upper surface of the movable lens barrel 202 which area is entirely covered with the cover 222 in the housed condition.

In order that the cover 222 does not interfere with the dioptric power adjusting ring 216 in the housed condition, a covering portion 222a for covering the dioptric power adjusting ring 216 is formed to protrude upward further than other portions.

In the dioptric power adjustment disabling means of this embodiment structured as described above, as shown in FIGS. 22 and 23, in the housed condition of the binocular body, the dioptric power adjusting ring 216 facing the external surface of the movable lens barrel 202 enters the covering portion 222a of the cover 222 so as to be entirely covered therewith. Thus, the operation of the dioptric power adjusting ring 216 is mechanically disabled.

If the movable lens barrel 202 is slid to change the condition of the binocular from the above condition to the condition where the distance between the left and right lens barrels 201 and 202 is large, more than half of the knob 220 of the dioptric power adjusting ring 216 is exposed out of the covering portion 222a of the cover 222 to cancel the dioptric power adjusting operation disabled condition as shown in FIGS. 28 and 29. As a result, the dioptric power adjusting ring 216 is freely operated.

Further, as shown in FIG. 30, in the condition where the distance between the left and right lens barrels 201 and 202 is maximum, the dioptric power adjusting ring 216 is completely exposed out of the covering portion 222a of the cover 222. Thus, the dioptric power adjusting ring 216 is maintained in the operable condition in the entire range of the used condition, so that the dioptric power can arbitrarily be adjusted at any pupil distance.

As described above, according to this embodiment, by devising configurations and arrangement positions of the cover 222 and the dioptric power adjusting ring 216, the dioptric power adjustment disabling function is realized without any special arrangement being added, so that substantial increase in manufacture cost is not brought about. As a result, it is surely prevented that the dioptric power adjusting ring 216 is inadvertently or erroneously operated. The arrangement of the dioptric power adjustment disabling means is not limited to the above-described embodiment as far as it can mechanically disable the operation of the dioptric power adjusting mechanism when the binocular is not used.

For example, referring to FIG. 34, the linear gear 219 and the circular gear 221 may be arranged to be detachable so that the distance therebetween increases with the movement of the movable lens barrel 202 to the housed condition. Alternatively, a friction member may be arranged to be pushed against a position of a mechanism including the dioptric power adjusting ring 216, the eyepiece holding frame 217, etc. when the movable lens barrel 202 is moved to the housed condition. Thus, this embodiment includes various modifications.

Figure 35:
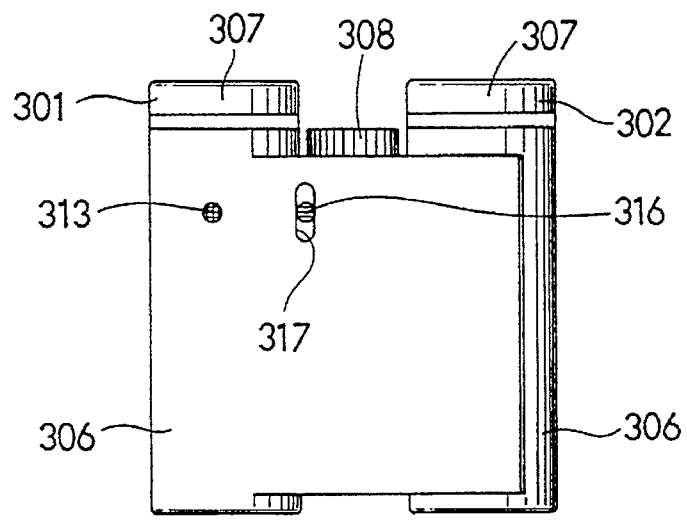
FIG. 35 is a plan view showing the exterior of a sixth embodiment of the present invention when the distance between left and right lens barrels is minimum.
Figure 36:
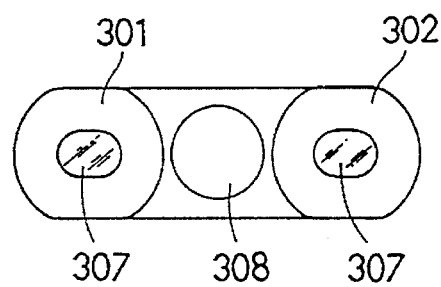
FIG. 36 is a front view thereof.
Figure 37:
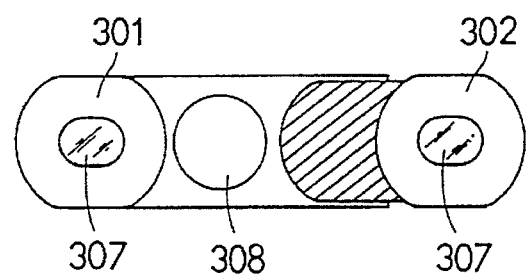
FIG. 37 is a front view of the binocular when the distance between the left and right lens barrels is maximum.
Figure 38:
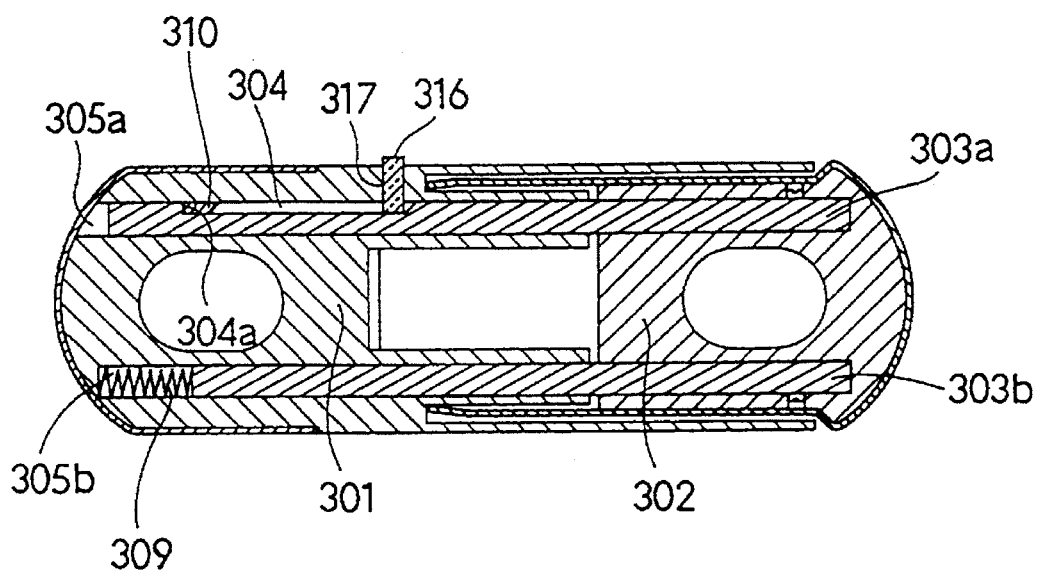
FIG. 38 is a longitudinal cross-sectional view thereof.
Figure 39:
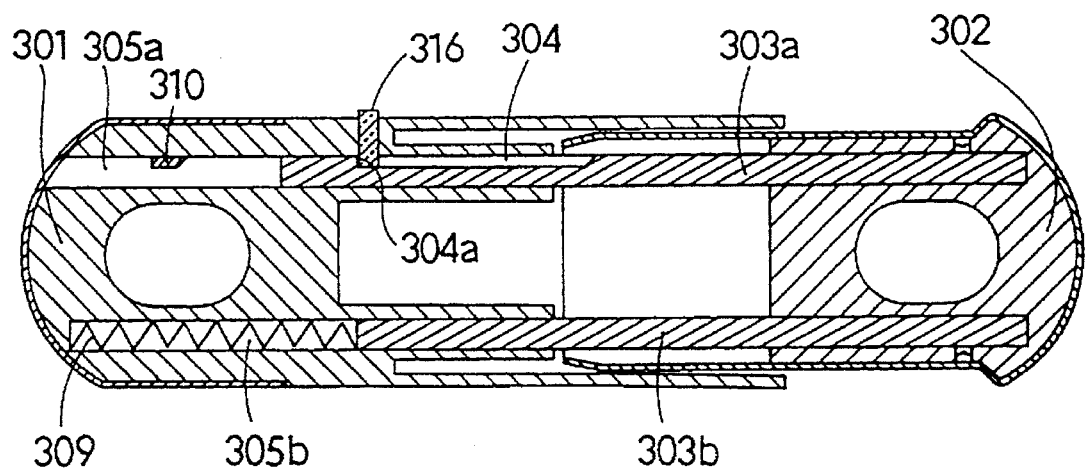
FIG. 39 is a longitudinal cross-sectional view of the binocular where the distance between the left and right lens barrels is maximum.

Hereinafter, a sixth embodiment of the present invention will be described with reference to the drawings. FIGS. 35 to 45 show the sixth embodiment where the present invention is employed for a horizontally-moved binocular. FIGS. 35 to 37 show the exterior thereof. FIGS. 38 and 39 show the cross section thereof. In these figures, reference numerals 301 and 302 represent left and right lens barrels, respectively. The lens barrel 301 is fixed and the lens barrel 302 is formed to be linearly movable relative to the lens barrel 301 in the horizontal direction so that the distance with the lens barrel 301 is increased or decreased.

By moving the movable lens barrel 302, the condition of the binocular body constituted by the left and right lens barrels 301 and 302 can be changed between the housed condition where the distance between the left and right lens barrels 301 and 302 is minimum as shown in FIG. 38 and the maximum pupil distance condition where the distance between the left and right lens barrels 301 and 302 is maximum as shown in FIG. 39. The pupil distance adjustment in the used condition can be performed between these conditions.

As shown in FIG. 38, several guiding rods (four in this embodiment, however, only two of them are shown) 303a and 303b are formed to protrude from a side surface of the movable lens barrel 302. Of the guiding rods 303a and 303b, at least one rod (two upper guiding rods 303a in this embodiment) has a key groove 304 formed thereon. Although not limited thereto, the key groove 304 is formed, for example, by cutting the upper half of the guiding rod 303a having a circular cross section into a semilunar form. Its length is set to be the same as or slightly longer than the maximum pupil distance adjustment range.

At positions in the fixed lens barrel 301 which face the guiding rods 303a and 303b of the movable lens barrel 302, guiding holes 305a and 305b into which the guiding rods 303a and 303b are slidingly inserted are formed. By sliding the guiding rods 303a and 303b in the guiding holes 305a and 305b, the left and right lens barrels 301 and 302 are parallely moved leftward and rightward with the optical axes being maintained parallel.

While in this embodiment, four guiding rods 303a and 303b are provided only to the fixed lens barrel 301 and the movable lens barrel 302 is provided with only the guiding holes 305a and 305b, by providing at least two guiding rods, the shake of the lens barrels 301 and 302 in the parallel movement can be prevented. Moreover, several guiding rods may be provided to each of the lens barrels 301 and 302. In this case, guiding holes are provided to correspond to the guiding rods.

Reference numeral 306 represents an objective lens unit provided at the front of each of the lens barrels 301 and 302. Reference numeral 307 represents an eyepiece. Reference numeral 308 represents a focus ring. The focus ring 308 is attached to be rotatable with its backward and forward movement being restricted and coupled to the left and right objective lens units through a non-illustrated focusing mechanism so as to move together therewith. By rotating the focus ring 308 with fingers, the left and right objective lens units 306 are simultaneously moved according to the amount of the rotation in the backward and forward direction (along the optical axis) relative to the eyepieces 307. Thus, focusing is performed. Typically, one of the eyepieces 307 is provided with a member (not shown) for focusing between the left and right optical systems, generally called the adjustment of dioptric power.

In the horizontally-moved binocular having the above-described basic structure, in this embodiment, the pupil distance is adjusted by a single operation by the following arrangement: Referring to FIG. 38, a pushing member 309 serving as a driving means is arranged in the lower guiding hole 305b of the fixed lens barrel 301. The pushing member 309 constituted by a compression coil spring abuts the end of the guiding rod 303b inserted in the lower guiding hole 305b to push the movable lens barrel 302 all the time in a direction to change the pupil distance from a reference pupil distance to a set pupil distance, i.e. in a direction to increase the distance between the left and right lens barrels 301 and 302.

Figure 40:
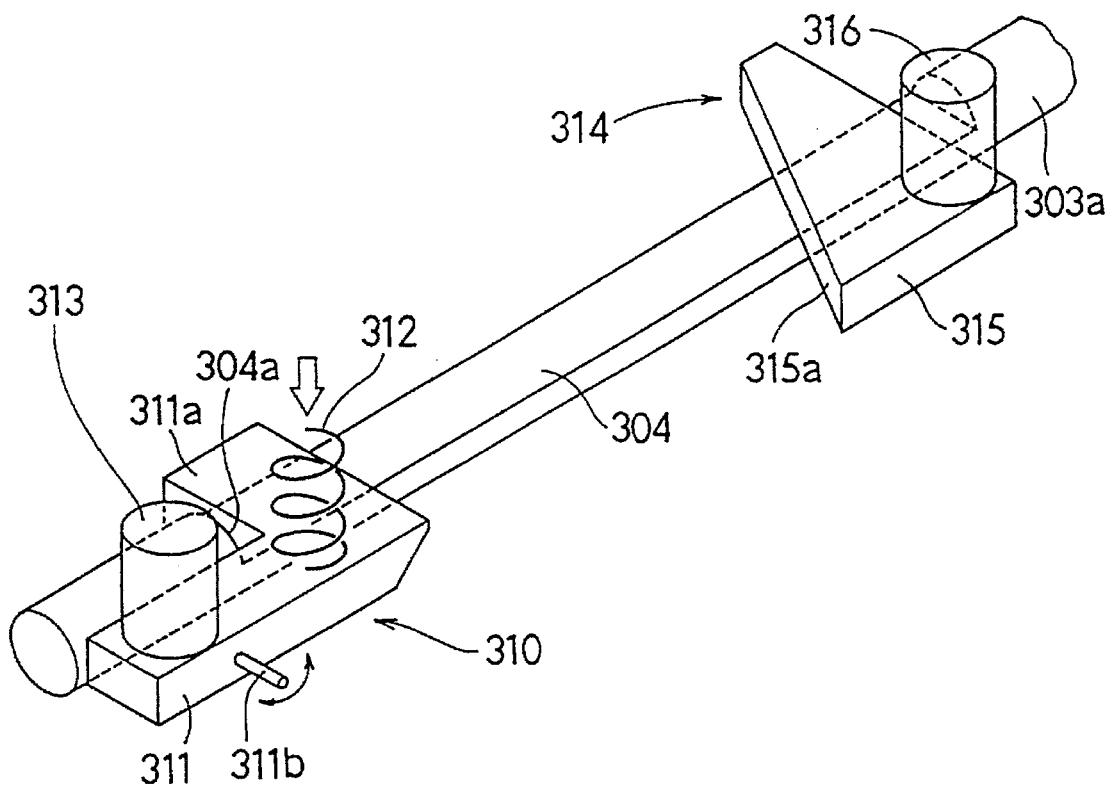
FIG. 40 is a perspective view showing a pupil distance adjusting mechanism.

FIG. 40 shows a relevant portion of a pupil distance adjusting mechanism provided to the upper guiding rod 303a. In FIGS. 38 and 40, a stopping mechanism 310 serving as a stopping member is attached to a portion facing the base end of the upper guiding hole 305a of the fixed lens barrel 301. The stopping mechanism 310 stops the left and right lens barrels 301 and 302 in the housed condition and holds the movable lens barrel 302 at the stopped position. The stopping mechanism 310 includes a stopping member 311 and a stopping spring 312 which pushes the front end of the stopping member 311 all the time.

The stopping member 311 is an L-shaped block-form member having a stopper 311a which can be engaged with an end step 304a of the key groove 304 of the guiding hole 303a. The stopping member 311 is attached to the fixed lens barrel 301 to be rotatable around a horizontal shaft 311b. The stopping spring 312 constituted by a compression coil spring is arranged between the fixed lens barrel 301 and the upper surface of the stopper 311a.

The stopping mechanism 310 of such a structure prevents the distance between the lens barrels 301 and 302 from increasing by inserting the stopper 311a of the stopping member 311 into the front end of the key groove 304 in the housed condition and holding the engaged condition by the pushing force of the stopping spring 312.

Reference numeral 313 is a push button serving as an operation means arranged on the upper surface of the stopping member 311 of the stopping mechanism 310 on opposite side of the stopper 311a about the horizontal shaft 311b and inserted into a through hole (not shown) provided in the fixed lens barrel 301 to protrude from the upper surface. The push button 313 is arranged at a position such that the user can easily operate it with a hand holding the fixed lens barrel 301.

When the push button 313 is depressed against the force of the stopping spring 312 in the housed condition, the stopper 311a of the stopping member 311 rotates about the horizontal shaft 311b to detach from the end step 304a. The guiding rod 303b disengaged thereby is forcibly moved by the pushing force of the pushing member 309 in a direction to increase the distance between the lens barrels 301 and 302. Together therewith, the guiding rods 303a and 303b are simultaneously moved.

Reference numeral 314 represents a pupil distance adjusting mechanism serving as a restricting means which restricts the range of driving of the left and right lens barrels 301 and 302 by the pushing member 309 within a range up to a set pupil distance condition. The pupil distance adjusting mechanism 314 is provided with a cam plate 315 and an operation shaft 316 formed integrally with the cam plate 315. The cam plate 315 is arranged on the key groove 304 and has a cam surface 315a inclining at a predetermined angle relative to the surface facing the front end of the key groove 304. The operation shaft 316 is inserted in a long hole 317 formed in the fixed lens barrel 301. Thereby, the movement of the operation shaft 316 is restricted to a direction perpendicular to the movement direction of the movable lens barrel 302.

When the pupil distance is adjusted by the pupil distance adjusting mechanism 314, the operation shaft 316 is moved along the long hole 317. At this time, in the illustrated example, by moving the operation shaft 316 forward toward the objective lens unit 306, the pupil distance restricting position is moved in a direction to increase the distance between the left and right lens barrels 301 and 302. Conversely, by moving the operation shaft 316 backward toward the eyepiece 307, the restricting position is moved in a direction to decrease the distance between the left and right lens barrels 301 and 302.

Figure 41:
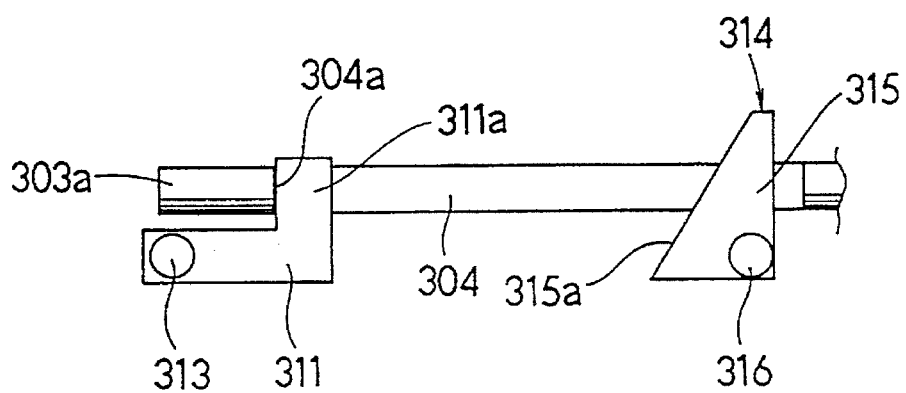
FIG. 41 is a plan view showing a housed condition.
Figure 42:
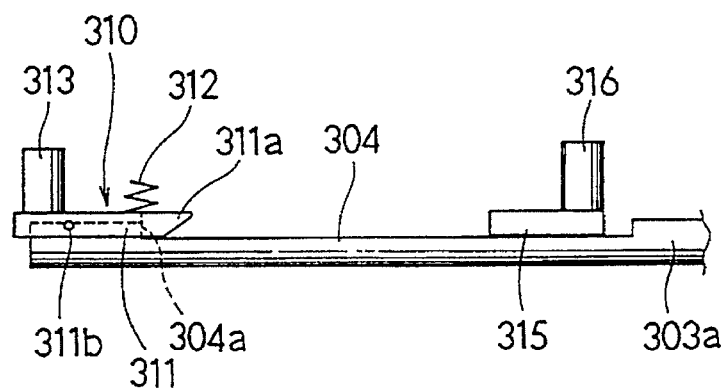
FIG. 42 is a front view of a relevant portion thereof.

Subsequently, a pupil distance adjusting operation of the binocular of the above-described arrangement will be described. In the housed condition where the distance between the fixed lens barrel 301 and the movable lens barrel 302 is minimum, as shown in FIGS. 41 and 42, the stopper 311a of the stopping member 311 of the stopping mechanism 310 is inserted in the key groove 304 of the upper guiding rod 303a to engage with the end step 304a, thereby preventing the guiding rod 303a from moving in a direction (rightward in the figure) to increase the distance between the left and right lens barrels 301 and 302. Thus, the guiding rods 303a and 303b of the movable lens barrel 302 are maintained at the positions of the housed condition where they are inserted in the guiding holes 305a and 305b of the fixed lens barrel 301 to their ends against the pushing force of the pushing member 309.

Figure 43:
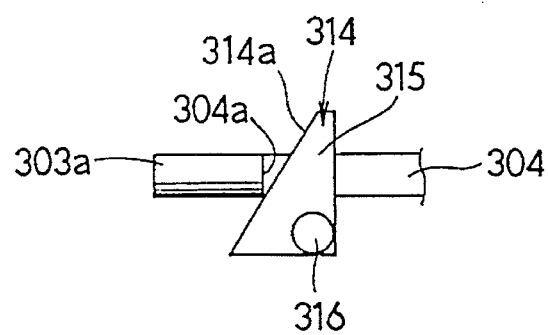
FIG. 43 is a plan view showing a used condition where stopping is canceled.
Figure 44:
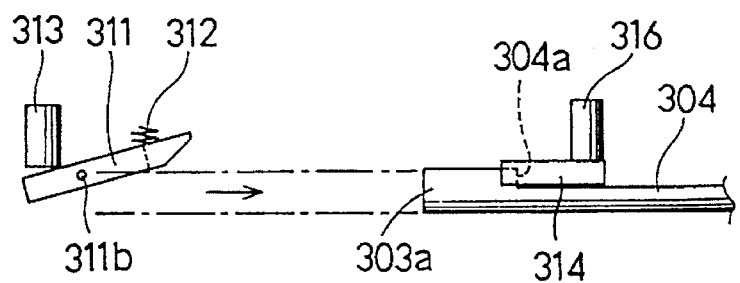
FIG. 44 is a front view thereof.

When the push button 313 is depressed under this condition, the stopping member 311 rotates against the pushing force of the stopping spring 312 to detach the stopper 311a from the end step 304a of the key groove 304. When the binocular is thereby released from the stopping by the stopping member 311, the pushing force of the pushing member 309 works so that the guiding rods 303a and 303b are forcibly moved rightward by being guided by the guiding holes 305a and 305b. By the movements of the guiding rods 303a and 303b, the end step 304a of the key groove 304 abuts the cam surface 315a of the cam plate 315 of the pupil distance adjusting mechanism 314 as shown in FIGS. 43 and 44. Thereby, the guiding rods 303a and 303b are stopped. Thus, the distance between the movable lens barrel 302 and the eyepiece 307 of the fixed lens barrel 301 which distance corresponds to the stop position is set as the pupil distance adjusted at that time.

By arranging the guiding rods 303a and 303b to be slidable in the guiding holes 305a and 305b while closely engaging therewith, the parallel movements of the lens barrels 301 and 302 are smoothly made.

To change the pupil distance, the operation shaft 316 is arbitrarily moved along the long hole 317. The cam plate 315 is slid backward and forward in response to the movement of the operation shaft 316 to change the position of the cam surface 315a which the end step 304a of the key groove 304 abuts, so that the stop positions of the guiding rods 303a and 303b, i.e. the set pupil distance is changed.

Figure 45:
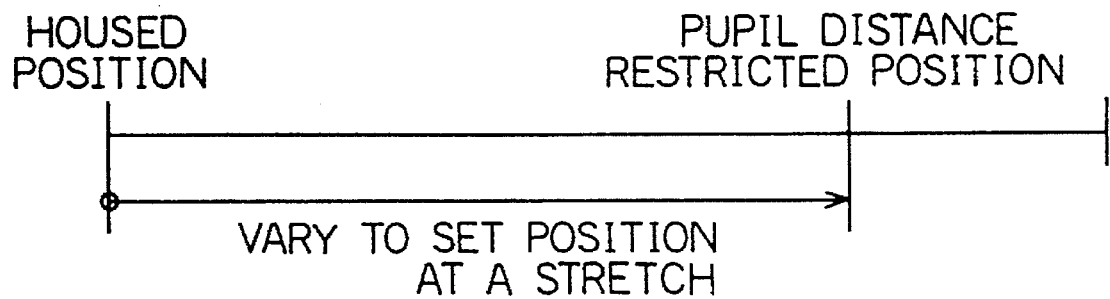
FIG. 45 is a diagram showing a mode of pupil distance adjustment.

Thus, according to this embodiment, either the lens barrel 301 or 302 is held by one hand and only by depressing the push button 313 with a finger of the hand holding the lens barrel, the pupil distance is changed at a stretch from the housed position to the set pupil distance position by the pushing force of the pushing member 309 as shown in FIG. 45.

The pupil distance adjustment range can be changed by changing the configuration of the cam plate 315. Thus, while in this embodiment, the pupil distance adjustment range set by the cam plate 315 and the housed condition where the movable lens barrel 302 is stopped by the stopping member 311 take different modes, it is possible to arrange so that an end of the pupil distance adjustment range is the housed condition by devising the configuration of the cam plate 315.

Obviously, many modifications and variations of the present invention are possible in light of the above teachings. It is therefore to be understood that within the scope of the appended claims, the invention may be practiced other than as specifically described.

What is claimed is:

1. A binocular comprising:

a pair of optical systems;

a mechanism which moves at least one of said optical systems relative to the other optical system so as to vary a distance between said optical systems; and a dioptric power adjusting member which adjusts a dioptric power of at least one of said optical systems, wherein an operation of said dioptric power adjusting member is disabled when said mechanism moves said at least one of said optical systems so that the distance between said optical systems is at least as short as a predetermined distance.

2. A binocular as claimed in claim 1, wherein said dioptric power adjusting member is manually operated, and wherein said binocular includes a cover member which covers the dioptric power adjusting member, said cover member covering the dioptric power adjusting member when the distance between said optical systems is at least as short as said predetermined distance.

3. A binocular as claimed in claim 2, further comprising a pair of movable lens barrels for supporting the pair of optical systems respectively, wherein said cover member is formed to be movable together with one of the lens barrels, and wherein said dioptric power adjusting member is formed to be movable together with the other of the lens barrels.

4. A binocular as claimed in claim 3, further comprising a body extending from one of the lens barrels for movably supporting the other of the lens barrels, wherein said cover member is formed in said body.

5. A binocular as claimed in claim 1, wherein said dioptric power adjusting member is a rotatable dial.

6. A binocular as claimed in claim 1, wherein each of said pair of optical systems is slidable so as to vary the distance between said optical systems.

7. A binocular capable of being operated so as to be changed over between a viewing condition in which said binocular is in a condition to be used for viewing and a non-viewing condition in which said binocular is not in a condition to be used for viewing, said binocular comprising:

a pair of optical systems; and a dioptric power adjusting member manually operated to adjust a dioptric power of at least one of the optical systems, wherein a manual operation of the dioptric power adjusting member is disabled when said binocular is operated to be in the non-viewing condition.

8. A binocular as claimed in claim 7, wherein said binocular includes a cover member which covers the dioptric power adjusting member, said cover member covering the dioptric power adjusting member when said binocular is in the non-viewing condition.

9. A binocular as claimed in claim 8, further comprising a pair of movable lens barrels for supporting the pair of optical systems respectively, wherein said cover member is formed to be movable together with one of the lens barrels, and wherein said dioptric power adjusting member is formed to be movable together with the other of the lens barrels.

10. A binocular as claimed in claim 9, further comprising a body extending from one of the lens barrels for movably supporting the other of the lens barrels, wherein said cover member is formed in said body.

11. A binocular as claimed in claim 8, wherein the binocular is changed over between the viewing condition and the non-viewing condition by changing a distance between the pair of optical systems.

12. A binocular as claimed in claim 11, wherein each of said pair of optical systems is slidable to allow changing of the distance between the pair of optical systems.

13. A binocular as claimed in claim 7, wherein said dioptric power adjusting member is a rotatable dial.

* * * * *